US012107915B2

(12) United States Patent
Kim et al.

(10) Patent No.: US 12,107,915 B2
(45) Date of Patent: Oct. 1, 2024

(54) DISTRIBUTED CLOUD SYSTEM, DATA PROCESSING METHOD OF DISTRIBUTED CLOUD SYSTEM, AND STORAGE MEDIUM

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong-si (KR); Su-Min Jang, Sejong-si (KR); Jae-Geun Cha, Daejeon (KR); Hyun-Hwa Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/333,717

(22) Filed: Jun. 13, 2023

(65) Prior Publication Data

US 2023/0412671 A1    Dec. 21, 2023

(30) Foreign Application Priority Data

Jun. 20, 2022  (KR) .......................... 10-2022-0075110
Apr. 10, 2023  (KR) .......................... 10-2023-0046881

(51) Int. Cl.
*H04L 67/10*    (2022.01)
*H04L 41/0654*    (2022.01)

(52) U.S. Cl.
CPC .......... *H04L 67/10* (2013.01); *H04L 41/0654* (2013.01)

(58) Field of Classification Search
CPC .............. H04L 67/10; H04L 41/0654

USPC ......................................................... 709/217
See application file for complete search history.

(56) References Cited

U.S. PATENT DOCUMENTS

| | | | |
|---|---|---|---|
| 10,298,670 | B2 | 5/2019 | Ben-Shaul et al. |
| 11,036,536 | B2 | 6/2021 | Wang |
| 11,070,639 | B2 | 7/2021 | Kim et al. |
| 11,252,159 | B2 | 2/2022 | Kannan et al. |
| 11,343,786 | B2 | 5/2022 | Kim et al. |

(Continued)

FOREIGN PATENT DOCUMENTS

| | | |
|---|---|---|
| KR | 10-2232364 B1 | 3/2021 |
| KR | 10-2245340 B1 | 4/2021 |

(Continued)

*Primary Examiner* — Wing F Chan
*Assistant Examiner* — Leon Y Tseng
(74) *Attorney, Agent, or Firm* — Rabin & Berdo, P.C.

(57) ABSTRACT

Disclosed herein are a distributed cloud system, a data processing method of a distributed cloud system, and a storage medium. The data processing method of a distributed cloud system includes receiving a request of a user for an edge cloud and controlling a distributed cloud system, wherein the distributed cloud system comprises a core cloud including a large-scale resource, the edge cloud, and a local cloud including a middle-scale resource between the core cloud and the edge cloud, processing tasks corresponding to the user request through a scheduler of the core cloud, distributing the tasks based on a queue, and aggregating results of processed tasks, and providing processed data in response to a request of the user, wherein the distributed cloud system provides a management function in case of failure in the distributed cloud system.

3 Claims, 24 Drawing Sheets

(56) References Cited

U.S. PATENT DOCUMENTS

| | | | | |
|---|---|---|---|---|
| 2003/0236848 | A1* | 12/2003 | Neiman | G06F 9/505 |
| | | | | 709/201 |
| 2016/0301757 | A1* | 10/2016 | Nelson | H04L 67/01 |
| 2016/0337474 | A1* | 11/2016 | Rao | H04L 41/12 |
| 2018/0019927 | A1* | 1/2018 | Addanki | H04L 41/12 |
| 2018/0097888 | A1* | 4/2018 | Roy | H04L 43/028 |
| 2019/0356599 | A1* | 11/2019 | Brissette | H04L 47/25 |
| 2020/0084202 | A1 | 3/2020 | Smith et al. | |
| 2021/0406696 | A1 | 12/2021 | Liu et al. | |
| 2022/0164186 | A1 | 5/2022 | Pamidala et al. | |

FOREIGN PATENT DOCUMENTS

| | | |
|---|---|---|
| KR | 10-2022-0062836 A | 5/2022 |
| KR | 10-2023-0024416 A | 2/2023 |

* cited by examiner

DISTRIBUTED CLOUD SYSTEM, DATA PROCESSING METHOD OF DISTRIBUTED CLOUD SYSTEM, AND STORAGE MEDIUM

CROSS REFERENCE TO RELATED APPLICATIONS

This application claims the benefit of Korean Patent Application Nos. 10-2022-0075110, filed Jun. 20, 2022 and 10-2023-0046881, filed Apr. 10, 2023, which are hereby incorporated by reference in their entireties into this application.

BACKGROUND OF THE INVENTION

1. Technical Field

The present disclosure relates generally to distributed cloud technology, and more particularly to data processing and service migration technology for edge computing in a distributed cloud environment.

2. Description of the Related Art

A migration function for service migration in a distributed cloud environment is provided to maintain a seamless service in a cloud environment in which services are redeployed in real time. Migration is performed between edge clouds or between an edge cloud and another cloud in consideration of aspects of resource deficiency, failure occurrence, and cost efficiency.

Further, a proximity service in an edge cloud requires a seamless (uninterrupted) service so as to support a mobile service. Therefore, as a key function of service migration management, a function of migrating a container- or virtual machine-based application is proposed as a scheme for overcoming failures in distributed clouds.

Edge computing technology requires some of enterprise data centers or centralized cloud services. Here, edge computing technology deploys, as some of various distributed computing topologies, computing storage software or the like from a core to an edge. Also, in order to provide a service faster than existing cloud terminal-centered centralized cloud infrastructure, the edge computing technology guarantees a response speed and security of safety-critical service by providing a core cloud-cloud edge-terminal collaboration-based low delay data processing technology which selectively utilizes computing resources closer to a service user. Currently, in order to overcome processing and transmission delay caused by central cloud concentration of rapidly increased data generated by large-scale terminals desired by a user, technology for providing an intelligent cloud edge service which processes data at a location closer to a terminal has been developed, and related service systems have been released. Among the related service systems, KUBERNETES™ operated as a single cluster is a tool that is designed to orchestrate and integrally operate an Open Container Initiative (OCI)-based container environment and is the most widely used tool at the present time. However, KUBERNETES™ is limited in the purpose of a single cluster environment, and requires a tool for associating multiple clusters with each other. Thereafter, Rancher was devised to install and establish multiple KUBERNETES™ clusters so as to support KUBERNETES™ configured using multiple clusters. Also, Rancher was devised and designed to allow a user to easily support all resources from a public cloud to a bare-metal server.

Further, in order to provide a service by associating cloud edges and core clouds that are distributed, research into various methods has been conducted. For this, as L7-layer-based service mesh technology, OpenShift (Istio) in an open source camp has been actively conducted. A service mesh is a program developed for association between microservices. Such a service mesh allows a control plane to be shared on multiple networks and allows clusters to communicate with each other through a gateway, and thus there is no need to directly connect two networks to each other.

Cloud computing is characterized that data is processed by a data center, but edge computing requires a high-performance platform that processes data at a location closer to a terminal and performs distributed collaboration between cloud-edge-terminals is required in order to perform processing attributable to cloud centralization of a large amount of data generated by large-scale edge terminals and overcome a transmission delay.

However, in an existing edge system, a management method in which multiple clusters are taken into consideration is insufficient.

Further, the existing edge system has been provided in a form that is not optimized for bare metal, a container, a Function as a Service (FaaS), etc.

Further, the existing edge system does not provide a resource addition method for guaranteeing performance when available resources are insufficient.

Furthermore, the existing edge system needs to be designed at the level of an application for vertical/horizontal collaboration.

Furthermore, the existing edge system has inadequate network structures for connecting multiple clusters at high speed.

Furthermore, the existing edge system is problematic in that the performance of Open Container Initiative (OCI) used in KUBERNETES™ is insufficient (i.e., latency occurs in a service sensitive to a response speed).

Furthermore, the existing edge system has no technology in architecture for perfect collaborative solutions.

Meanwhile, Korean Patent Application Publication No. 10-2023-0024416 entitled "Method and Apparatus for Migration of Virtual Machine across Cloud Platform, and Storage Medium and Electronic apparatus" discloses an apparatus and method for migrating virtual machines one by one to the disk storage library of a target virtual machine in a target cloud platform.

SUMMARY OF THE INVENTION

Accordingly, the present disclosure has been made keeping in mind the above problems occurring in the prior art, and an object of the present disclosure is to provide service migration for efficient collaboration between clusters.

Another object of the present disclosure is to provide a high-speed network connection between multiple clusters for a collaboration service.

A further object of the present disclosure is to provide optimal management for collaboration between clusters on a connected network.

In accordance with an aspect of the present disclosure to accomplish the above objects, there is provided a data processing method of a distributed cloud system, including receiving a request of a user for an edge cloud and controlling a distributed cloud system, wherein the distributed cloud system includes a core cloud including a large-scale resource, the edge cloud, and a local cloud including a middle-scale resource between the core cloud and the edge cloud, processing tasks corresponding to the user request through a scheduler of the core cloud, distributing the tasks based on a queue, and aggregating results of processed tasks, and providing processed data in response to a request of the user, wherein the distributed cloud system provides a management function in case of failure in the distributed cloud system.

The management function may include data movement control between multiple edge clouds including the edge cloud, the movement control may be configured to check states of the edge clouds and store current states of snapshot images, and transmission of the snapshot images between the edge clouds may be reduced using a shared storage.

The data processing method may further include performing migration of storing the snapshot images in a checkpoint repository corresponding to the shared storage of the edge clouds.

In accordance with another aspect of the present disclosure to accomplish the above objects, there is provided a distributed cloud system, including one or more processors; and a memory configured to store at least one program that is executed by the one or more processors, wherein the processor is configured to receive a request of a user for an edge cloud and control a distributed cloud system, wherein the distributed cloud system includes a core cloud including a large-scale resource, the edge cloud, and a local cloud including a middle-scale resource between the core cloud and the edge cloud, wherein the processor is configured to execute processes of processing tasks corresponding to the user request, distributing the tasks based on a queue, and aggregating results of processed tasks; and providing processed data in response to a request of the user, wherein the processor is configured to perform a management function in case of failure in the distributed cloud system.

The management function may include data movement control between multiple edge clouds including the edge cloud, the movement control may be configured to check states of the edge clouds and store current states of snapshot images, and transmission of the snapshot images between the edge clouds may be reduced using the memory.

The processor may be configured to perform migration of storing the snapshot images in a checkpoint repository corresponding to a shared storage of the edge clouds.

In accordance with a further aspect of the present disclosure to accomplish the above objects, there is provided a storage medium for storing a computer-executable program, the program executing instructions including receiving a request of a user for an edge cloud and controlling a distributed cloud system, wherein the distributed cloud system includes a core cloud including a large-scale resource, the edge cloud, and a local cloud including a middle-scale resource between the core cloud and the edge cloud; processing tasks corresponding to the user request, distributing the tasks based on a queue, and aggregating results of processed tasks; providing processed data in response to a request of the user, and wherein the instructions perform a management function in case of failure in the distributed cloud system.

The management function may include data movement control between multiple edge clouds including the edge cloud, the movement control may be configured to check states of the edge clouds and store current states of snapshot images, and transmission of the snapshot images between the edge clouds may be reduced using a shared storage.

The program may be configured to perform migration of storing the snapshot images in a checkpoint repository corresponding to a shared storage of the edge clouds.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
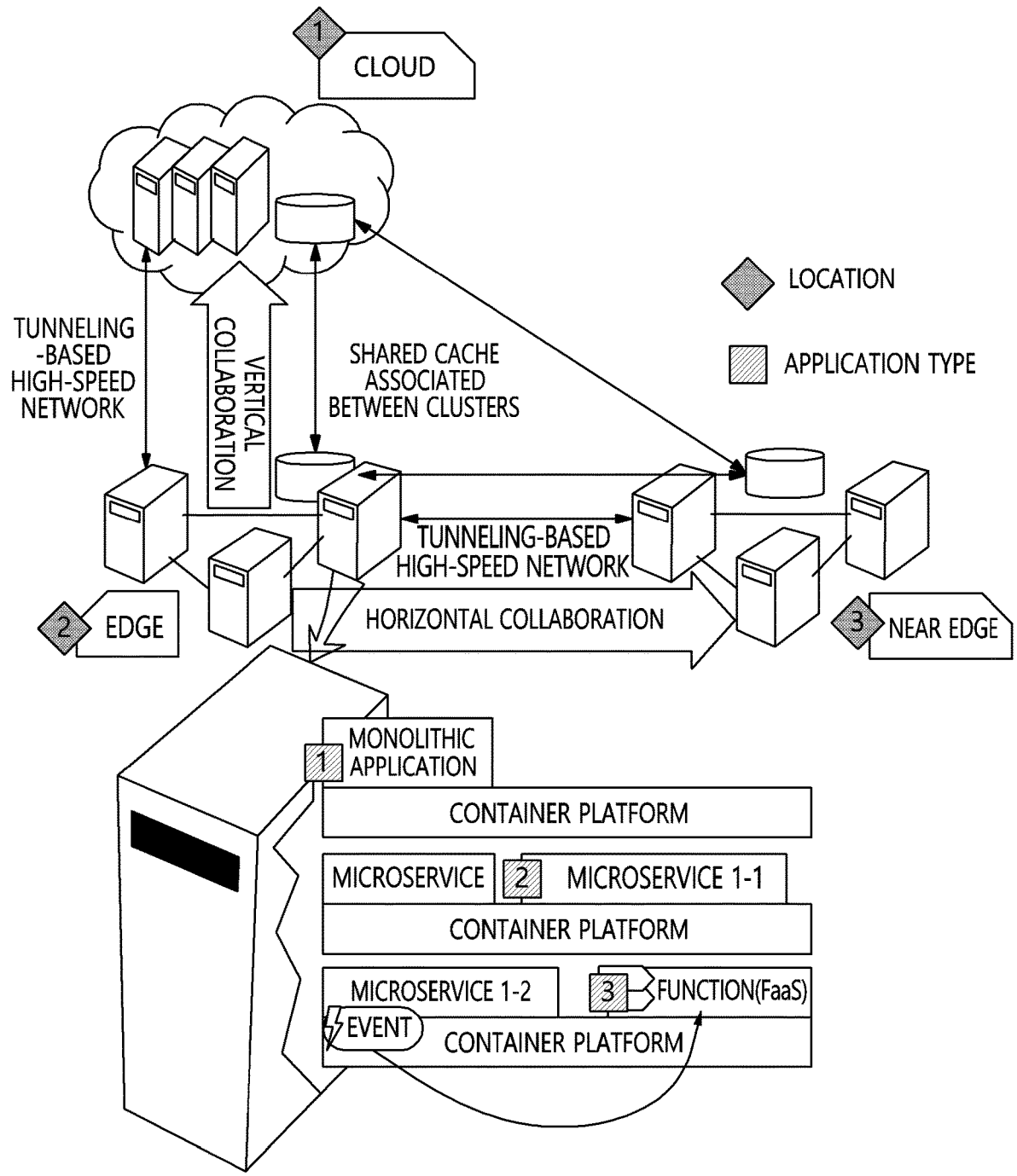
FIG. 1 is a diagram illustrating an edge service system according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the attached drawings.

FIG. 1 is a diagram illustrating an edge service system according to an embodiment of the present disclosure.

Referring to FIG. 1, it can be seen that the edge service system is implemented as a hybrid cloud of a cloud and an edge system.

Here, referring to FIG. 1, vertical collaboration in the edge service system according to the embodiment of the present disclosure refers to a collaboration structure between a core cloud and an edge, and horizontal collaboration refers to a collaboration structure between edges. The edge service system requires network connections for collaboration between edges, whereby a tunneling-based high-speed network for the network connection is established, and shared storage and a repository for associating respective clusters in the edges with each other are configured between the edges. The edge service system configured in this way may be driven and managed by a global scheduler that takes charge of the overall management.

Basically, the nodes of each cluster may be container platforms, and may be composed of a monolithic application, a microservice, a Function as a Service (FaaS), etc. As described above, each container platform may be configured based on a memory-resident container that utilizes a memory-based storage device, and a global cache may also utilize memory-based storage for high-speed configuration.

The edge service system according to the embodiment of the present disclosure may refer to a hybrid cloud environment including three locations at which a near edge system, together with the cloud and the edge system, is taken into consideration.

The three locations may include a cloud (i.e., public/private cloud), an edge (i.e., an edge serviced with the edge directly connected to a user), and a near edge (i.e., a neighboring edge closer to the edge).

Further, the edge service system according to an embodiment of the present disclosure may provide three application types.

The three application types may include monolithic application (App), a micro-service, and a Function as a Service (FaaS).

It can be seen that the three application types have different properties, as shown in the following Table 1, from the standpoint of complexity of an application, service scale, and a resource usage form. The edge service system according to the embodiment of the present disclosure needs to effectively apply a function such as mutual collaboration or service movement in which the above-described properties are desirably reflected.

TABLE 1

|  | Complexity | Scale | Resource usage form |
| --- | --- | --- | --- |
| Monolithic application | Simple | Middle | Always uses resources |
| Microservice | Complicated | Large | Enables expansion/reduction of partial resource usage |
| FaaS | Simple | Small | Temporarily uses resources |

Figure 2:
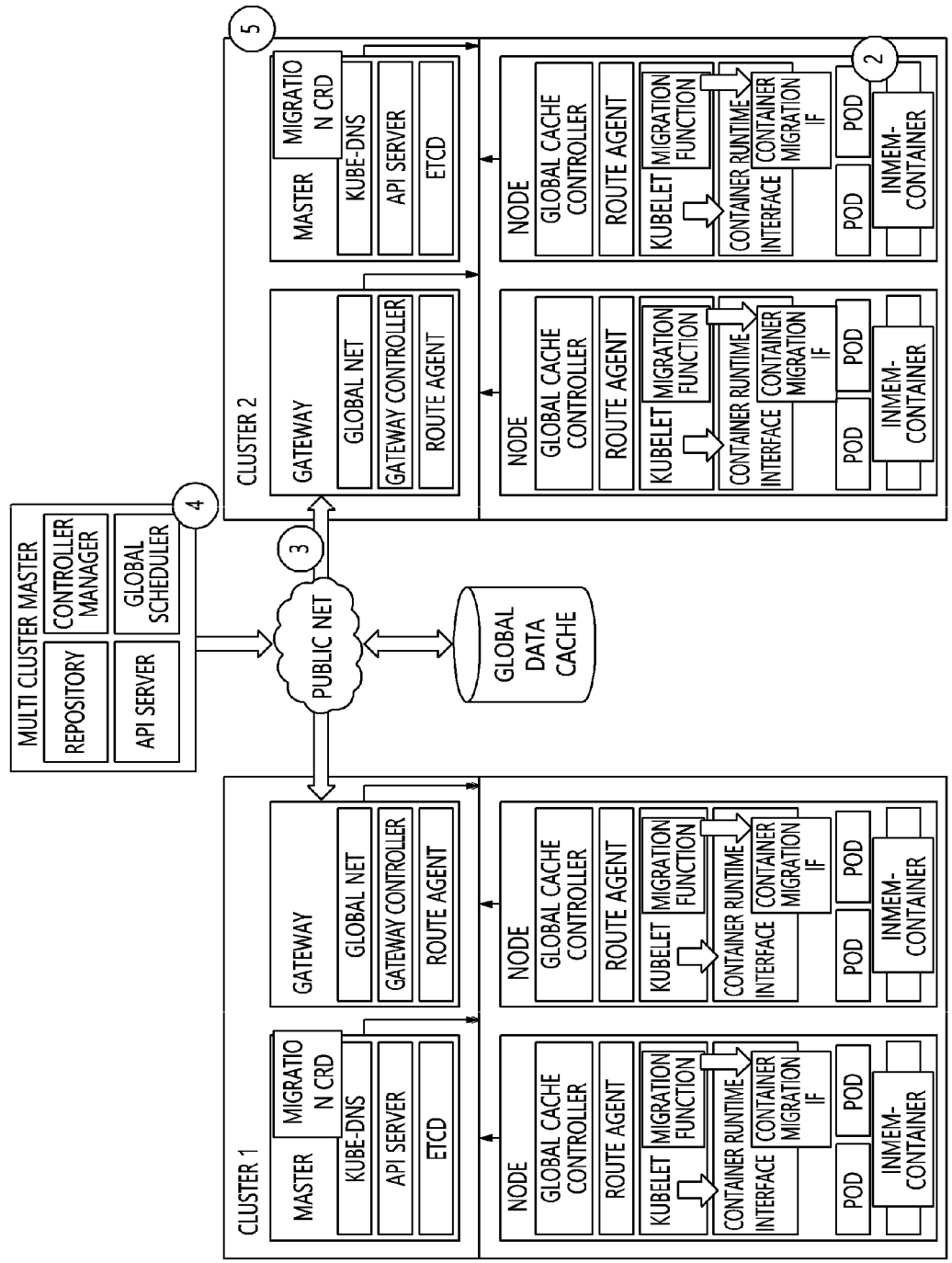
FIG. 2 is a diagram illustrating a multi-cluster structure for collaboration including migration according to an embodiment of the present disclosure.

FIG. 2 is a diagram illustrating a multi-cluster structure for collaboration including migration according to an embodiment of the present disclosure.

Referring to FIG. 2, a cluster for migration among multiple clusters is connected to an additional cluster (including a cloud) based on the multi-cluster structure, thus supporting various types of services.

Here, the cluster may include a management function for smoothly providing a gateway connection function and a routing function between clusters for the purpose of high-speed data transmission across the multiple clusters, and may be associated with a platform management function.

Furthermore, the cluster may include a function of providing an interworking interface and data movement convenience so as to migrate a user service and large-capacity data on the corresponding cluster. For this, the cluster may include a global repository for high-speed data movement (transfer) between clusters.

The cluster is configured such that the migration of a service to be run in each platform or a distributed cloud for offloading for vertical or horizontal collaboration is performed and managed by running an enabler for providing a migration function to a master and executing an agent for operation in each node or cluster.

The cluster may perform a service migration task by mainly processing an application service migration procedure and a related data migration procedure.

Furthermore, the cluster may support a fast data migration task between nodes configuring a global scheduler (GS) to perform offloading. The cluster may provide an additional management function for multi-cluster interconnection to perform data migration and service migration between multiple clouds.

Furthermore, the cluster may be interconnected to the global scheduler to perform the task of monitoring the status of a service running on each cluster, selecting a cluster to which the service is to be migrated, and deploying the service. For this, each cluster may include a repository for managing monitoring information configured in the corresponding cluster and a function of managing the repository.

Further, the cluster may perform a network separation and resource separation function so that information configured in each cluster is separable into respective clusters. The migration function to be performed may include a function of performing a resource-concentrated computation task based on a global scheduler resource load monitoring function and a network monitoring function by utilizing a separate processor such as a hardware accelerator, or an external device such as a cluster or a cloud.

Furthermore, the structure illustrated in FIG. 2 may also be applied to a distributed cloud having a global scheduling function and a global resource management function, and the cloud may include a core cloud and a regional cloud. Furthermore, the structure of the cloud may also be formed in a hybrid cloud form.

Figure 3:
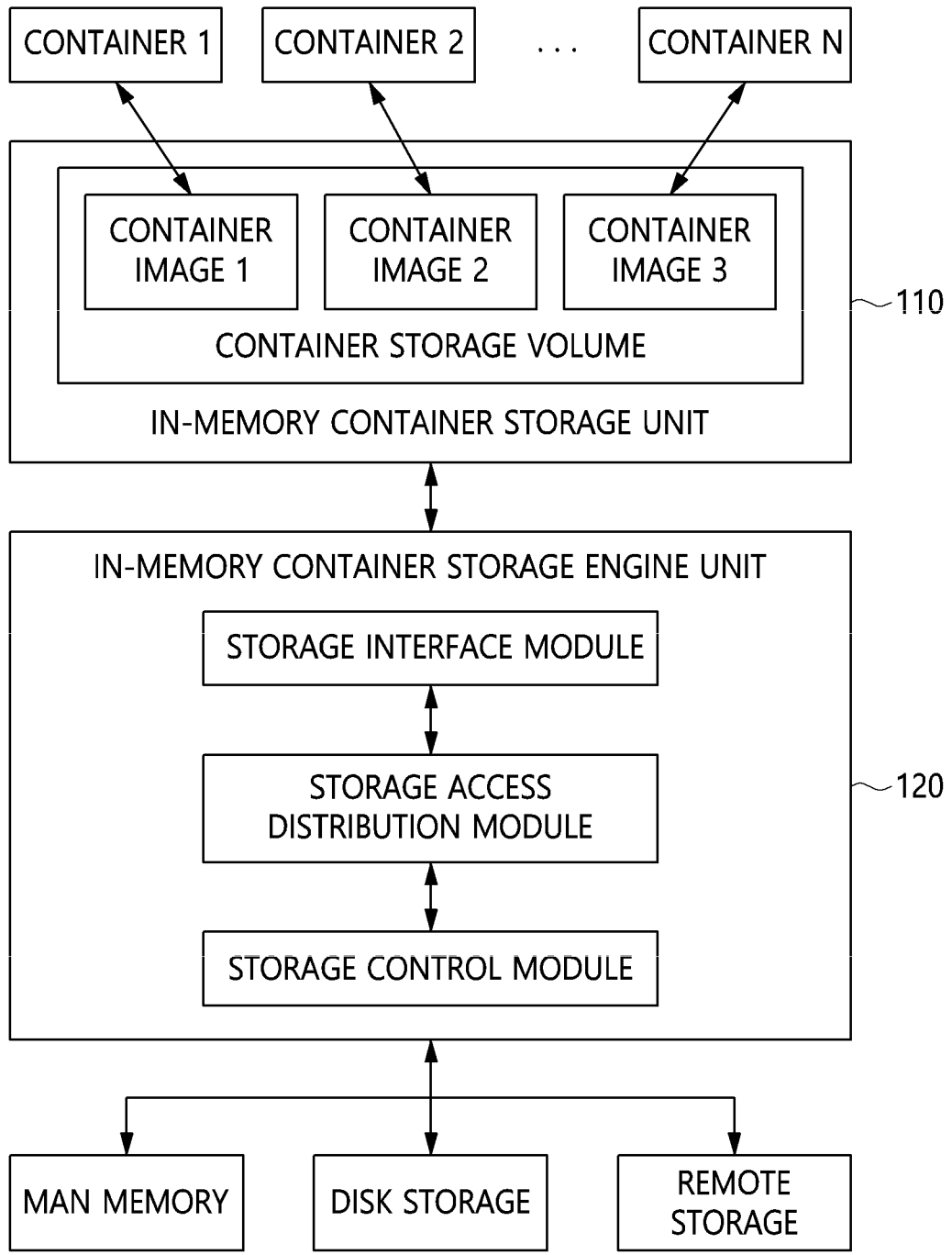
FIGS. 3 and 4 are block diagrams illustrating in-memory-based container storage according to an embodiment of the present disclosure.
Figure 4:
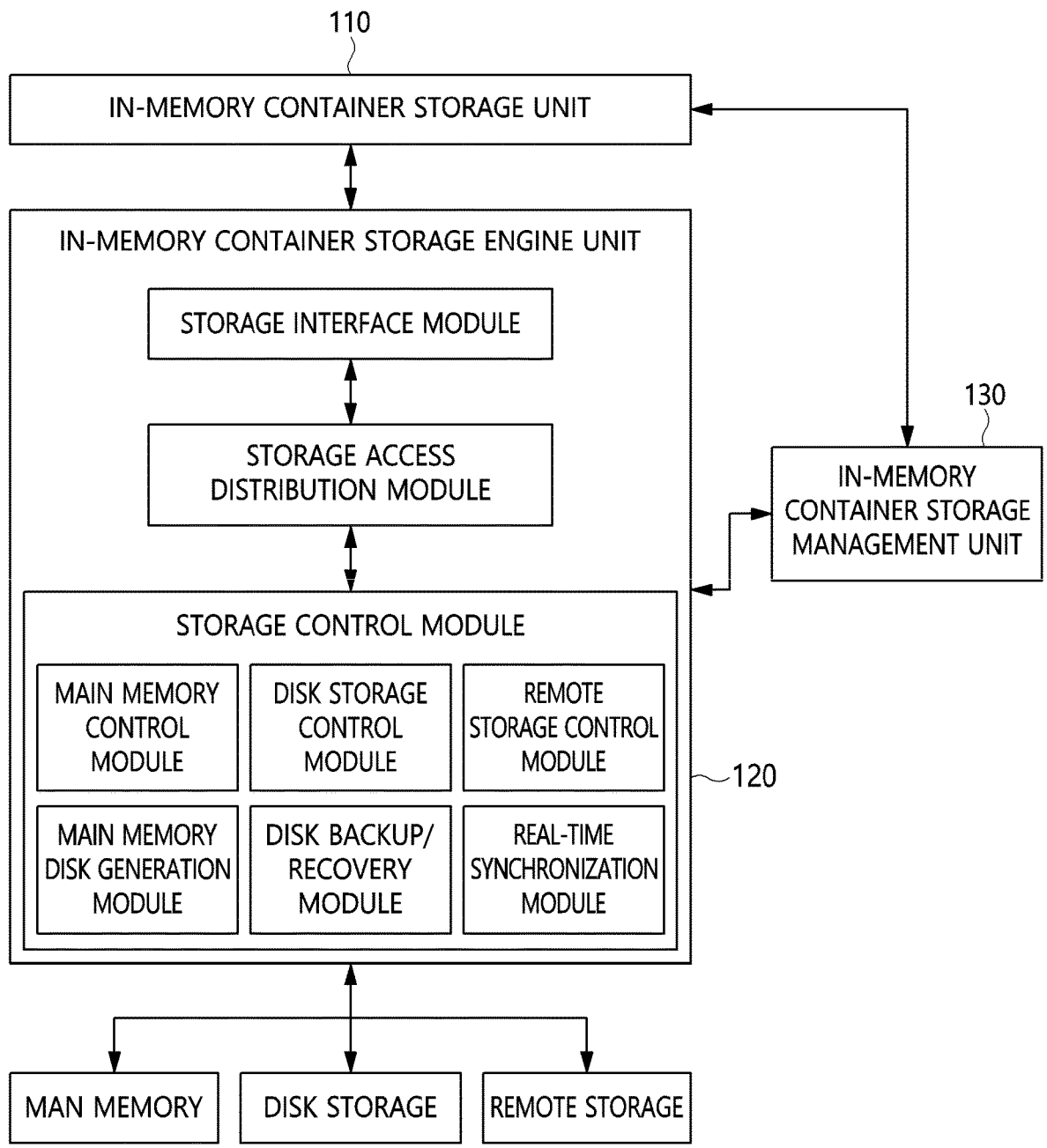

FIGS. 3 and 4 are block diagrams illustrating in-memory-based container storage according to an embodiment of the present disclosure.

Referring to FIGS. 3 and 4, the in-memory-based container storage according to an embodiment of the present disclosure may include an in-memory container storage unit 110, an in-memory container storage engine unit 120, and an in-memory container storage management unit 130.

The in-memory-based container storage according to an embodiment of the present disclosure may correspond to a repository for managing monitoring information configured in each cluster described above.

The in-memory container storage unit 110 may create a container storage volume by generating container images from multiple containers.

Here, the in-memory container storage unit 110 may include storage in main memory having nonvolatile characteristics.

Here, the in-memory container storage unit 110 may create and operate the volume of a file system (example of a docker is /var/lib/docker) in which the container is running.

The in-memory container storage engine unit 120 may generate in-memory container storage, implemented as a container storage volume having a single storage shape, in the in-memory container storage unit 110 by unifying the main memory, disk storage, and remote storage.

In this case, the in-memory container storage engine unit 120 may include a container file system which stores a container for providing application virtualization, and the container file system may include a merged access layer, a container layer, and an image layer.

Here, the container storage volume may be implemented as a container file system which includes the merged access layer, the container layer, and the image layer, and in which unified processing of individual layers is performed using a unifying-file system function.

Here, the container file system may perform unified processing of the layers using the unifying-file system function.

Here, the unifying-file system function may be configured to mount a user directory and related directories that are included in the layers of the container file system and to perform unified processing on the user directory and the related directories.

Here, the image layer may include lower directories in which the link information is stored.

Here, the container layer may store difference information about modification details of the image layer depending on the user's access.

In this case, the merged access layer may include the user directory which allows the user to access the link information of the image layer through the container layer and receive a file requested by the user to be shared.

Here, the in-memory container storage unit 110 may provide a standard block storage interface, and may operate the same without separate modification.

The in-memory container storage unit 110 may receive a container access command issued by the container.

The in-memory container storage engine unit 120 may generate single shape in-memory container storage by unifying the main memory, the disk storage, and the remote storage.

The in-memory container storage engine unit 120 may process a disk access command by utilizing the main memory, the disk storage, and the remote storage in a unified manner.

The in-memory container storage engine unit 120 may include a storage interface module, a storage access distribution module, and a storage control module.

The storage interface module may provide a standard block storage-type interface, and may receive the disk access command issued by the container. The received command may be transferred to the storage access distribution module.

The storage access distribution module may determine whether a service is to be performed using the main memory storage, the disk storage or the remote storage depending on the features of the disk access command, and may transfer the corresponding access command to a main memory control module, a disk storage control module, and a remote storage control module.

The main memory control module may process the disk access command using the main memory, whereby a high data access speed may be provided.

A main memory disk generation module may perform actual read/write operations on the main memory that is accessible on an address basis in response to disk access commands that are transmitted on a block basis. By means of this operation, the main memory disk generation module may store data, present in a virtual disk, in the main memory.

The disk storage control module may process a virtual desk access command using the disk storage.

The in-memory container storage management unit 130 may provide shared data to the user.

Here, the in-memory container storage management unit 130 may provide a sharing management function of the shared storage through a container file system layer management module, and may individually configure an area for file sharing and provide the area to the user.

Here, the in-memory container storage management unit 130 may provide link information of files in the container layer and the image layer to an application and allow the application to access the files in response to the request of the user.

Figure 5:
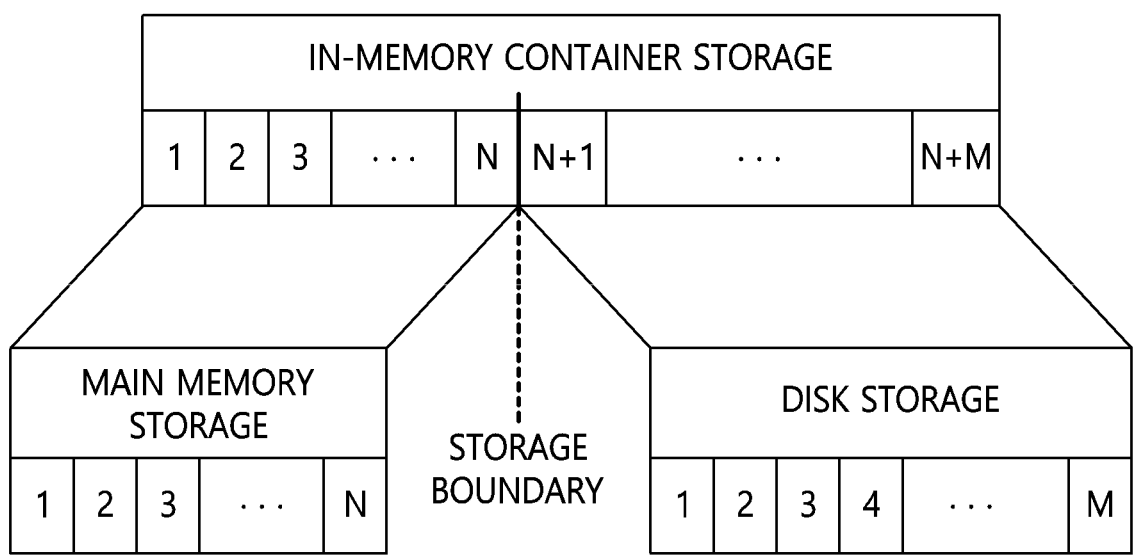
FIG. 5 is a diagram illustrating a process of generating in-memory container storage according to an embodiment of the present disclosure.

FIG. 5 is a diagram illustrating a process of generating in-memory container storage according to an embodiment of the present disclosure.

Referring to FIG. 5, a process of generating single hybrid-type in-memory storage by unifying main memory storage and disk storage is illustrated. The in-memory container storage may provide a standard block storage format, and may be generated by mapping the area of the main memory storage to the first part of the storage and by mapping the area of the disk storage to the latter part of the storage.

The block IDs 1 to N of the main memory storage are mapped to the block IDs 1 to N of the in-memory container storage. The block IDs 1 to M of the disk storage are mapped to the block IDs N+1 to N+M of the in-memory container storage. Further, a storage boundary may be established between the block IDs N and N+1 of the in-memory container storage.

Figure 6:
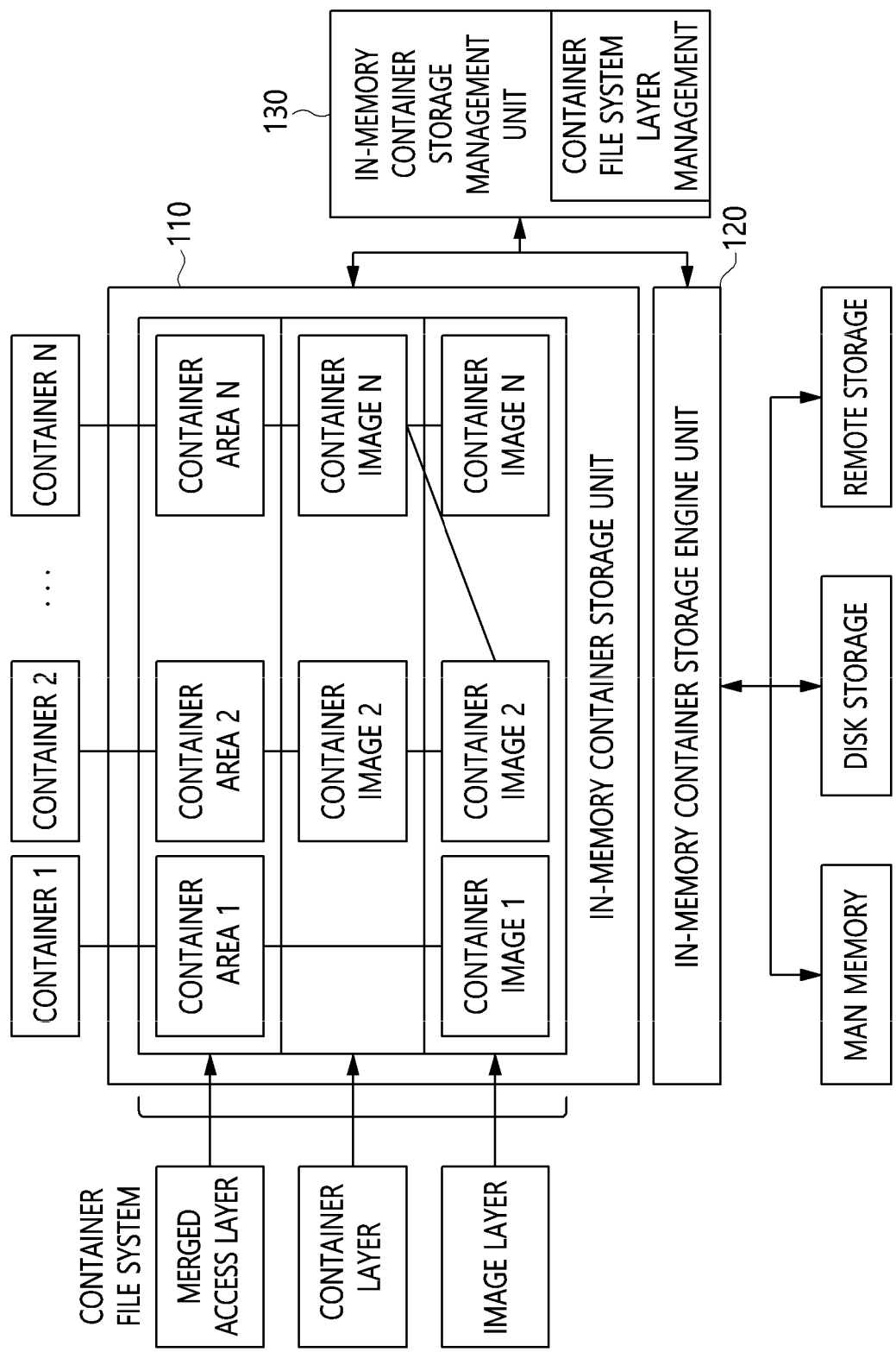
FIG. 6 is a block diagram illustrating a container file system implemented in in-memory storage according to an embodiment of the present disclosure.

FIG. 6 is a block diagram illustrating a container file system implemented in in-memory storage according to an embodiment of the present disclosure.

Referring to FIG. 6, a file system used in a container according to an embodiment of the present disclosure is illustrated.

In order to drive the main memory of the container, the basic file system of the container may be executed in the main memory. The container may individually provide files required by a user using a unifying-file system function included in the kernel of an existing Linux environment.

Here, the unifying-file system function may allow multiple file systems to be mounted at a single mount location, and may unify and process all directory entries on a Virtual File System (VFS) layer instead of generating a new file system type. Therefore, when the unifying-file system function is used, directory entries of a lower file system are merged with directory entries of an upper file system, and thus logical combinations of all mounted file systems may be generated. Therefore, it may become possible to locally manage all file systems shared by the system and locally search for files, and file management for entire sharing of the file systems may be facilitated.

The container file system may be configured using the unifying-file system function, and may be implemented in the form of layers. The container file system may be entirely configured using a merged access area (merged access layer), a container layer area (container layer), and an image layer area (image layer). Each layer may be operated by creating and mounting a specific directory in the in-memory container storage.

The container layer may be implemented as a writable layer, and may be generated on the uppermost layer of each container and may have its own status for each container. After the containers are created, all modification tasks on the containers may be written.

Because read/write (W/R) operations are performed on the memory, they may be performed at high speed. Further, the container layer may include information about a difference between an actual image and a container image so as to improve efficiency of file management.

The image layer may be a read-only layer, and may be shared with other containers. Further, an image shared with other layers may be operated as multiple images on the container layer.

Furthermore, the merged access layer may store a user directory including link information of a layer accessible to all file systems of the container layer and the image layer, and the user directory may be shared with the user. By means of this, the user may access files.

The image layer may be shared with various different systems, and thus the efficiency thereof may be improved. As shown in FIG. 6, the container image of the image layer needs to be pulled from a public repository (e.g., github) when the corresponding container is deployed.

In order to guarantee performance, it may be efficient to use a method of storing an image used by the container system in a local area or of previously fetching the image therefrom. In the present disclosure, a previously pulled image may be stored in the shared storage so that the image is reused.

As described above, a lot of images in the image layer may be present in the in-memory container storage, and the container images of the entire system may be backed up and then be stored in the disk storage or the remote storage.

Here, the stored container images may be added to the image layer. Then, the stored images may be used in the container layer, and images may be continuously provided from the merged access layer.

Figure 7:
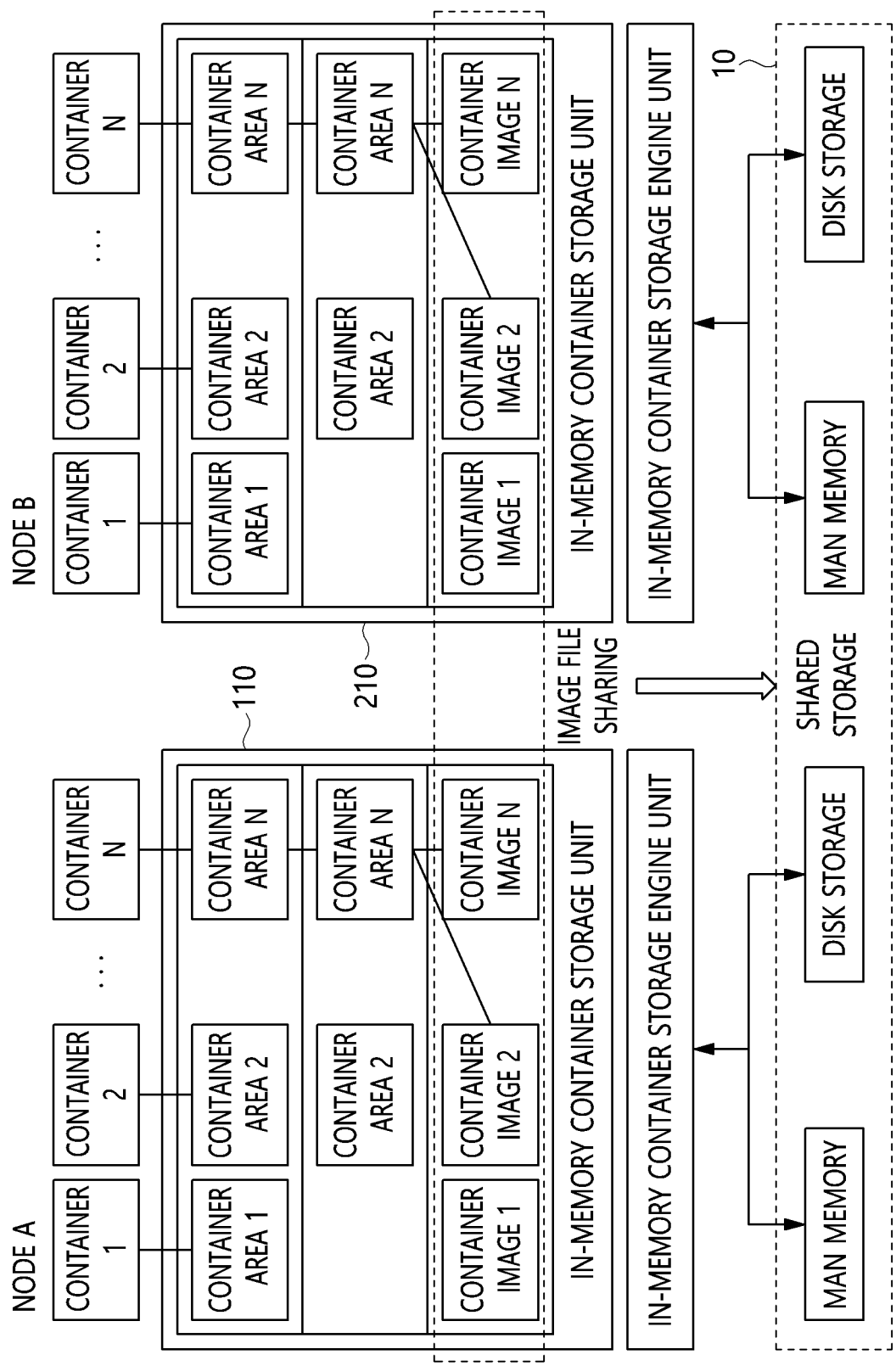
FIG. 7 is a diagram illustrating an image-sharing environment for in-memory container storage according to an embodiment of the present disclosure.

FIG. 7 is a diagram illustrating an image-sharing environment for in-memory container storage according to an embodiment of the present disclosure.

Referring to FIG. 7, it can be seen that the image-sharing environment for the in-memory container storage according to an embodiment of the present disclosure is illustrated.

Shared storage may be network file storage (e.g., a storage area network (SAN), network attached storage (NAS), or the like) or storage connected to a local disk.

Here, container images stored in the shared storage may be provided to a user in response to the request of the user.

An in-memory container storage management unit 130 may provide shared data to the user.

Here, the in-memory container storage management unit 130 may provide a sharing management function of the shared storage through a container file system layer management module, and may individually configure a region for file sharing and provide the region to the user.

Figure 8:
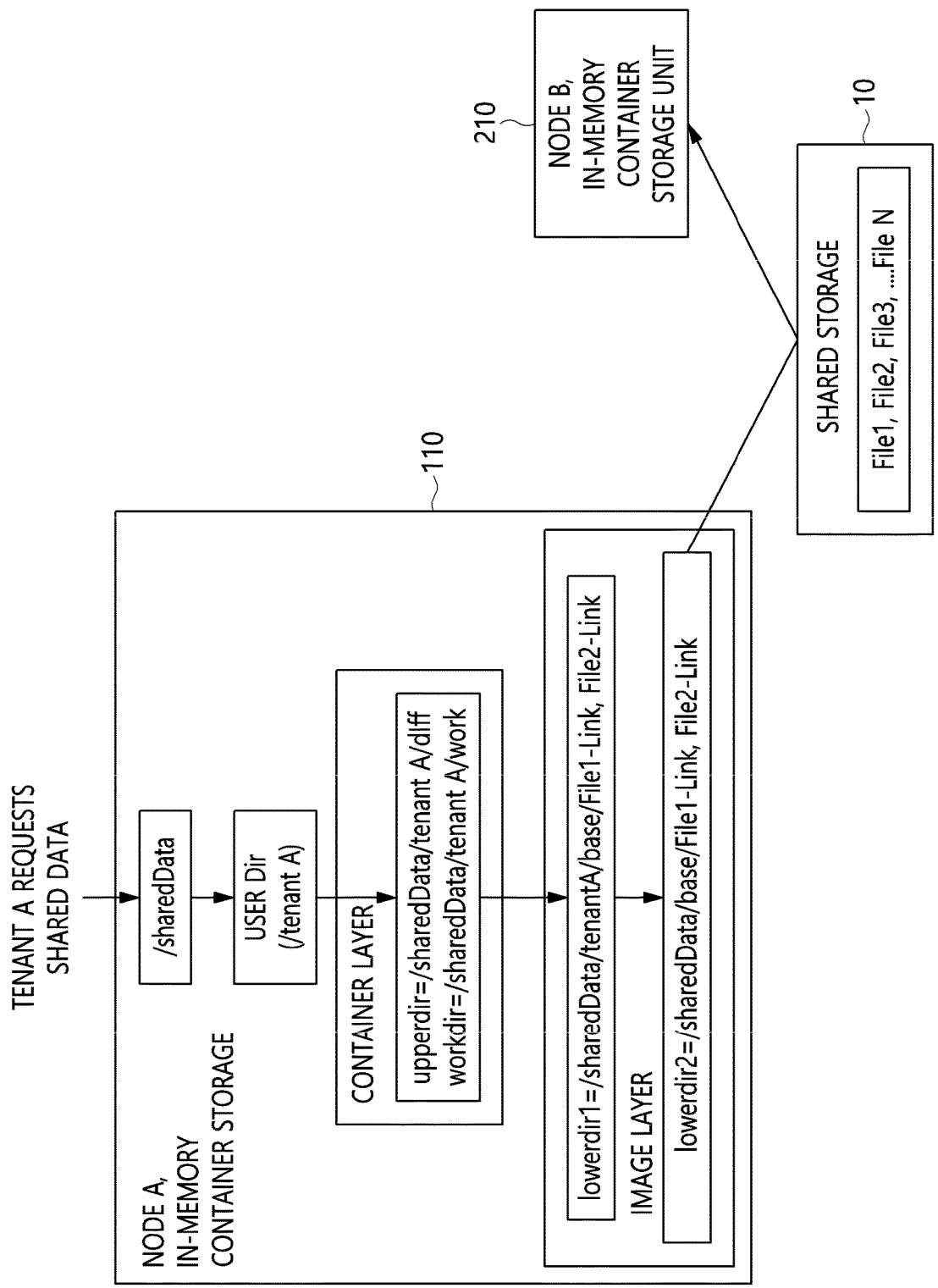
FIG. 8 is a diagram illustrating a user-shared environment in a node having in-memory container storage according to an embodiment of the present disclosure.

FIG. 8 is a diagram illustrating a user-shared environment in a node having in-memory container storage according to an embodiment of the present disclosure.

Referring to FIG. 8, the structure of a user-shared environment in a node having both a storage configuration according to a user (tenant), configured in the in-memory container storage, and in-memory container storage, configured to provide shared data, is illustrated.

It can be seen that a data-sharing technique in the user-shared environment illustrated in FIG. 8 provides a tenant access method so as to identify data desired to be shared according to the group that uses shared data from the standpoint of security rather than a method of sharing all data.

Here, in response to the request of the user, the directory of the user (tenant) (/sharedData/tenentA) may be created, and an upper directory may be created under the tenant's directory (/sharedData/tenentA) in the container layer and may be mapped to the tenant's directory. Here, for file system management, deduplicated data may be used as the tenant's data.

The upper directory created under the tenant's directory may be included in the container layer, and difference information about modification details of the image layer may be stored for each user (tenant) as the corresponding user makes access to the upper directory. Further, a work directory may also be created under the tenant's directory, and may be mapped to the tenant's directory. The work directory may correspond to the user data storage area of the container layer.

In the image layer, a first lower directory (lowerdir1=/sharedData/tenantA/base/File1-Link, File2-Link) is linked to the upper directory under the tenant's directory, and thus link information may be arranged only for a file selected by the user from among the files stored in the shared storage.

Furthermore, the image layer includes a second lower directory (lowerdir2=/sharedData/base/File1-Link, File2-Link, . . . , FileN-Link/) located in the lowermost portion thereof, and the second lower directory may be a management point at which all file links of the shared storage are stored, and may be set to the base directory of the shared storage (/sharedData/base). In addition, the second lower directory may be exposed to the management system so that, for file management, the user selects a required file. By means of this process, the user may view only the file selected by the user through the lower system.

The merged access layer allows the user to receive files requested to be shared through the user directory shared with the user, and the lower directories may always remain unchanged. That is, the lower directories may be used as read-only directories. This is an efficient method for write protection when sharing a shared file among multiple users.

In addition, when modifications occur in a file in the lower directories, the modifications are written to the upper directory, and thus all shared files may be efficiently managed.

Figure 9:
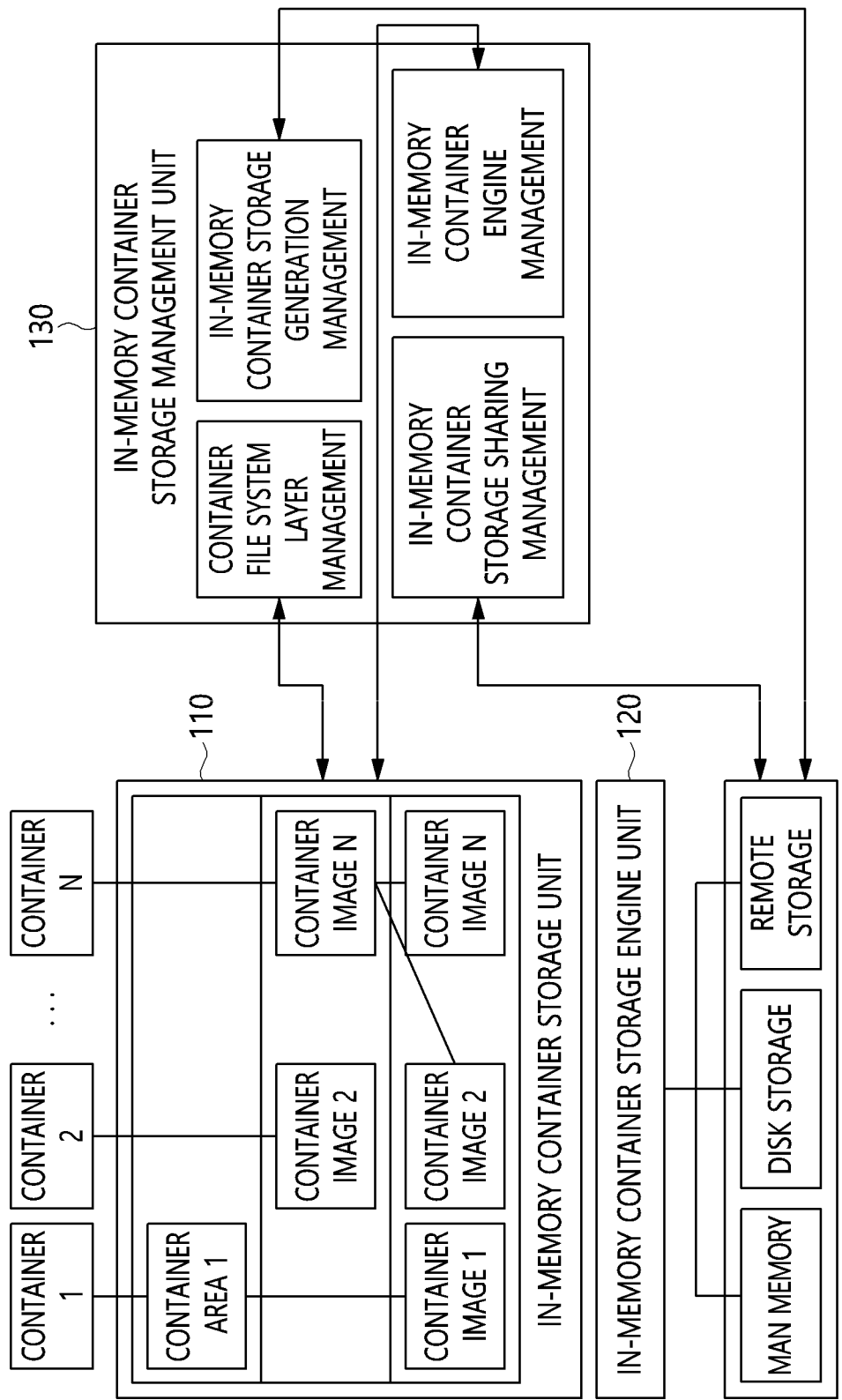
FIG. 9 is a block diagram illustrating in detail an example of the in-memory container storage management unit illustrated in FIG. 4.

FIG. 9 is a block diagram illustrating in detail an example of the in-memory container storage management unit illustrated in FIG. 4.

Referring to FIG. 9, the in-memory container storage management unit 130 may include a container file system layer management module, an in-memory container storage generation management module, an in-memory storage sharing management module, and an in-memory container storage engine management module.

The container file system layer management module may monitor the current state and running state of a container file system.

In this case, the container file system layer management module may manage the generation and state of the container system when the in-memory container storage is used.

The in-memory container storage generation management module may generate in-memory container storage when a container is configured in an in-memory form in response to the request of a user.

Here, when the in-memory container storage is generated by the in-memory container storage generation management module, the container file system layer management module may generate the container file system of the corresponding system.

The in-memory container storage sharing management module may generate a shared file system between storages to share an image layer in response to the request of the user and synchronize the shared file system.

Here, the in-memory container storage sharing management module may merge the link information of the image layer into a single system, and may synchronize the merged link information.

The in-memory container storage engine management module may generate and run the in-memory container storage driver of the corresponding system, and may monitor the state of the in-memory container storage driver.

Figure 10:
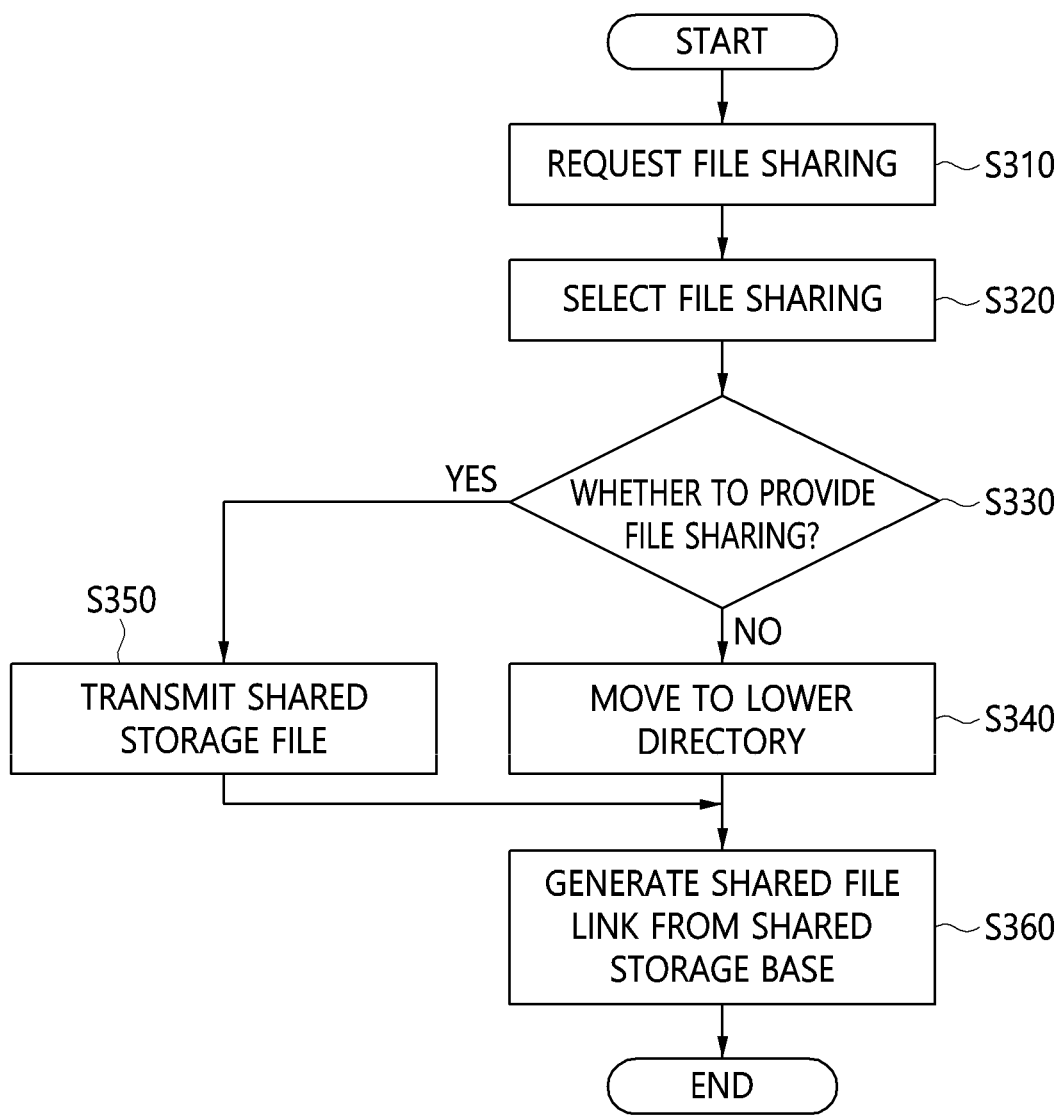
FIG. 10 is an operation flowchart illustrating a method for managing in-memory-based container storage according to an embodiment of the present disclosure.
Figure 11:
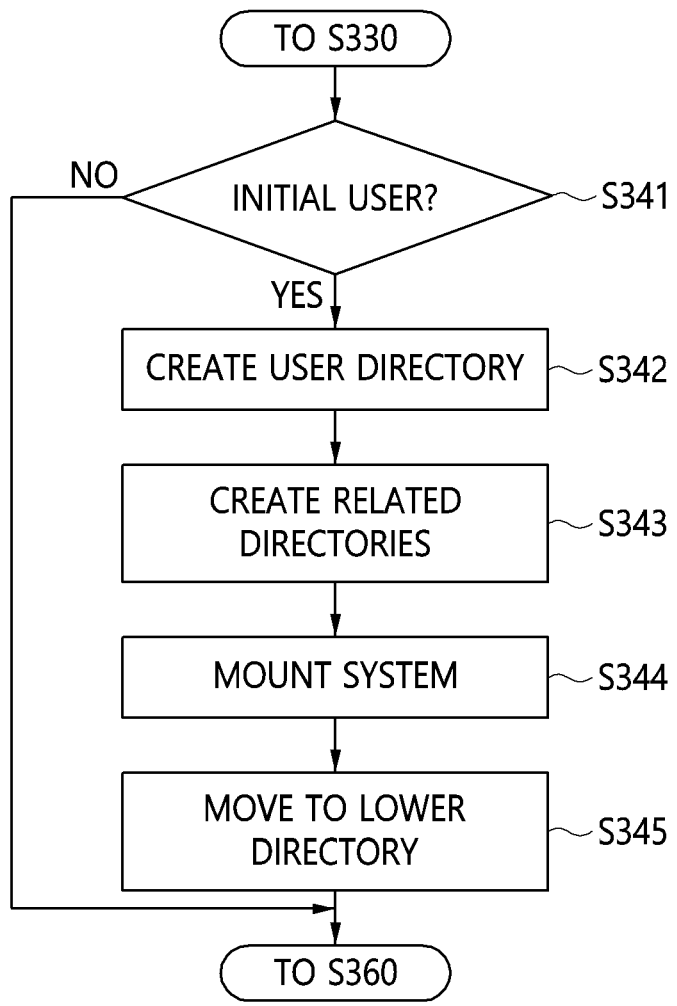
FIG. 11 is an operation flowchart illustrating in detail an example of the directory creation step illustrated in FIG. 10.

FIG. 10 is an operation flowchart illustrating a method for managing in-memory-based container storage according to an embodiment of the present disclosure. FIG. 11 is an operation flowchart illustrating in detail an example of the directory creation step illustrated in FIG. 10.

Referring to FIG. 10, the method for managing the in-memory-based container storage according to the embodiment of the present disclosure may receive a request for a file to be shared by the shared storage from a user at step S310.

Here, at step S310, a user request to allocate the in-memory-based container storage may be received.

In this case, the in-memory container storage may include a container file system which stores a container for providing application virtualization, and the container file system may include a merged access layer, a container layer, and an image layer.

Here, the image layer may include lower directories in which the link information is stored.

Here, the container layer may include an upper directory which stores difference information about modification details of the image layer depending on the user's access.

In this case, the merged access layer may include a user directory (tenant directory) which allows the user to access the link information of the image layer through the container layer and receive shared files requested by the user.

At step S320, files for which file sharing is to be provided may be selected by the user.

Further, at step S330, whether the corresponding user is a user who is to be provided with file sharing or a provider who provides file sharing may be determined.

Here, at step S330, when the corresponding user is the user who is to be provided with file sharing, the in-memory container storage management apparatus moves to a lower directory at step S340. When the user is the provider who provides file sharing, a shared storage file may be transmitted at step S350.

Referring to FIG. 11, in a procedure at step S340, whether the user is an initial user may be determined at step S341.

Here, in the procedure at step S340, when the user is the initial user, the in-memory container storage management apparatus may create a user (tenant) directory at step S342, create related directories (e.g., upper, work, lower, and merged directories) at step S343, mount the entire environment at step S344, and move to the user's lower directory at step S345.

Here, in the procedure at step S340, when the user is not an initial user, the in-memory container storage management apparatus may directly move to a lower directory present in a previously created user directory at step S345.

Furthermore, at step S360, in the user's lower directory, information about a link to a shared file requested by the user as to file sharing from a shared storage base directory may be generated.

Here, at step S360, the file requested by the user may be shared using the link information.

At step S350, when it is determined that the user is the provider who provides file sharing, the file to be shared with the shared storage may be uploaded to the user directory.

In this case, at step S360, the in-memory container storage management may generate link information to the shared file uploaded to the user directory by moving to the base directory of the shared storage.

Here, at step S360, the in-memory container storage management apparatus may provide link information of files in the container layer and the image layer to an application and allow the application to access the files in response to the request of the user.

Figure 12:
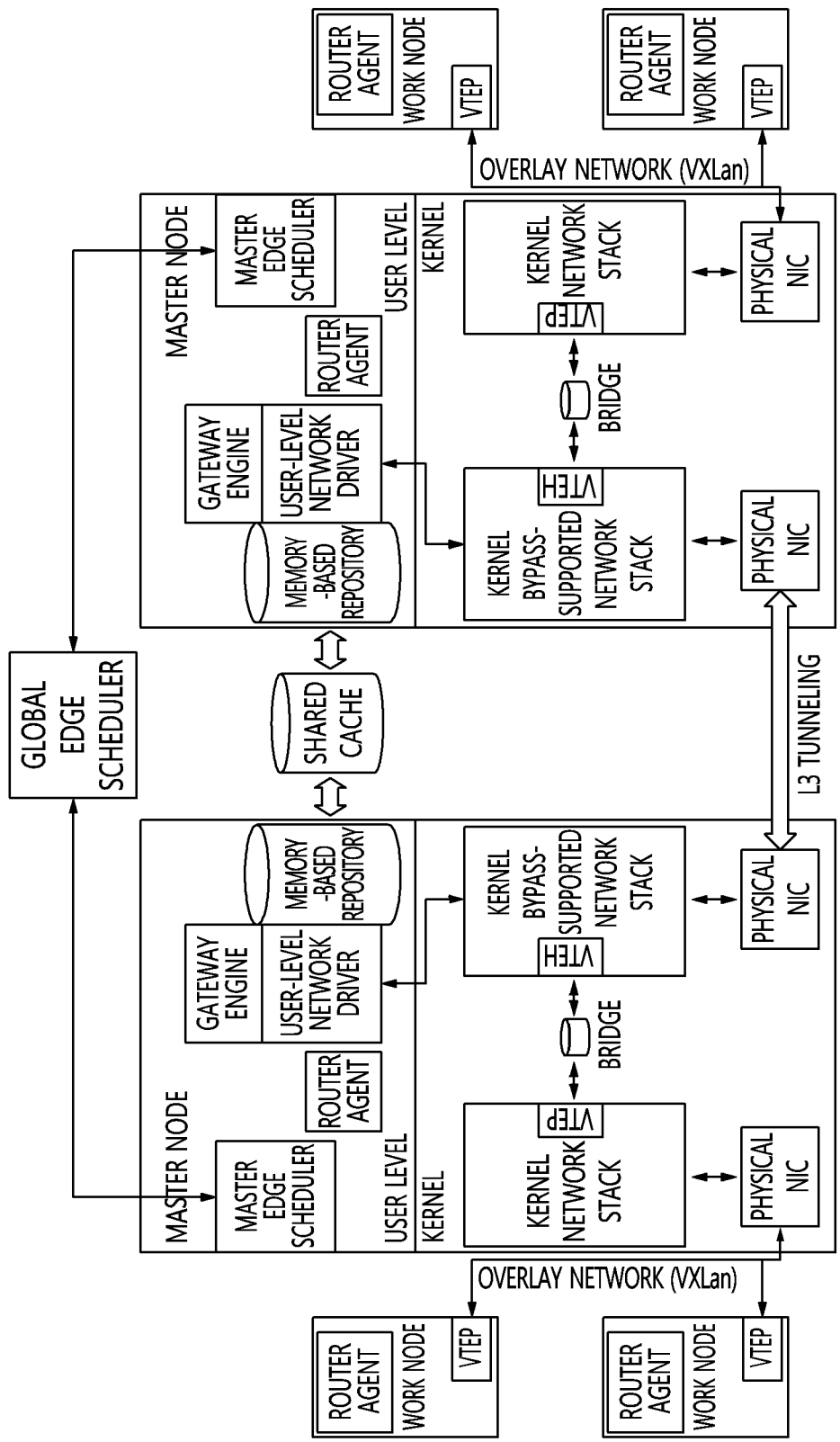
FIG. 12 is a diagram illustrating a service connection structure between clusters for a collaboration service according to an embodiment of the present disclosure.

FIG. 12 is a diagram illustrating a service connection structure between clusters for a collaboration service according to an embodiment of the present disclosure.

Referring to FIG. 12, edge computing may allow an edge computing service to be smoothly provided, and may maximize the efficiency of processing of large-capacity data and a distributed environment.

For this, considerations related to a horizontally distributed environment between cloud edges and a vertically distributed environment between a core cloud and a cloud edge may be essentially required in order to provide a collaboration function for edge computing.

Edge computing requires technology for interconnection between clusters and high-speed distributed deployment in order to allow services applied to the distributed environment to be locally distributed and deployed across the clusters and to be connected to a high-speed network. Therefore, edge computing may include a function of network connection to multiple cluster nodes of the cloud edge system and interfaces thereof.

Furthermore, edge computing may include a fast data movement (migration) and repository association function, together with the network connection function.

As illustrated in FIG. 12, the service connection structure refers to a network connection function across multiple clusters so as to make core-edge interconnection and edge-edge interconnection.

The network connection function may interconnect different networks so as to use a near edge attributable to the mobile service of a cloud edge and provide a seamless service.

The cluster according to the present disclosure may provide a high-speed gateway (gateway engine) function to connect multiple clusters to a network and a basic routing (router agent) function for recognition in the clusters. The gateway and the router may perform a management function on the clusters, and may be locally deployed through a global scheduler.

The high-speed gateway is a network connection scheme for connecting and operating multiple clusters at high speed, and may connect the clusters through tunneling between two networks.

By means of the effect of tunneling, reliable data transmission may be guaranteed by encapsulating a payload in a tunneling interval and utilizing a specific protocol. Tunneling may be applied to layers L7, L3, and L2 among seven layers of the Internet. As tunneling on a lower-level layer is supported, multiple protocols used on an upper layer may be used without change, and fast performance may be realized. In the present disclosure, two clusters may be interconnected using layer L3 tunneling. In order to improve the processing speed of the protocol used for tunneling in which clusters are interconnected in this way, a user-level network driver (Data Plane Development Kit: DPDK) for kernel bypass may be used for connection to the tunneling network. Also, an interface between a master node and a worker node may be connected to a tunneling interface through a bridge, and may be connected to a network implemented as an existing overlay network.

A high-speed gateway engine function may perform multi-cluster tunneling in layer L3 that utilizes a user-level network driver.

A global shared cache function may allow high-speed shared storage to be generated based on a network-based storage system that utilizes a memory-based repository, after which data may be shared through interconnection between the high-speed shared storage and a local shared cache. In this case, the global shared cache function may allow the storage in the master node to be utilized as network-based shared storage.

A kernel bypass-supported network stack configuration function may include a library for kernel bypass, device management, and configuration management (e.g., DPDK hardware-supported stack).

A user-level network driver management function may include a CLI function (a network driver provided in an application stage, e.g., Cisco FD.io or the like) of deploying, connecting, and managing a user-level network driver.

A router agent function may be executed in all nodes, may configure a path using endpoint resources synchronized with other clusters, and may activate connections among all clusters. Here, the router agent function may establish the rules of Iptables. The router agent may have a routing table of a gateway engine so as to communicate with the gateway engine in association with the gateway engine.

Figure 13:
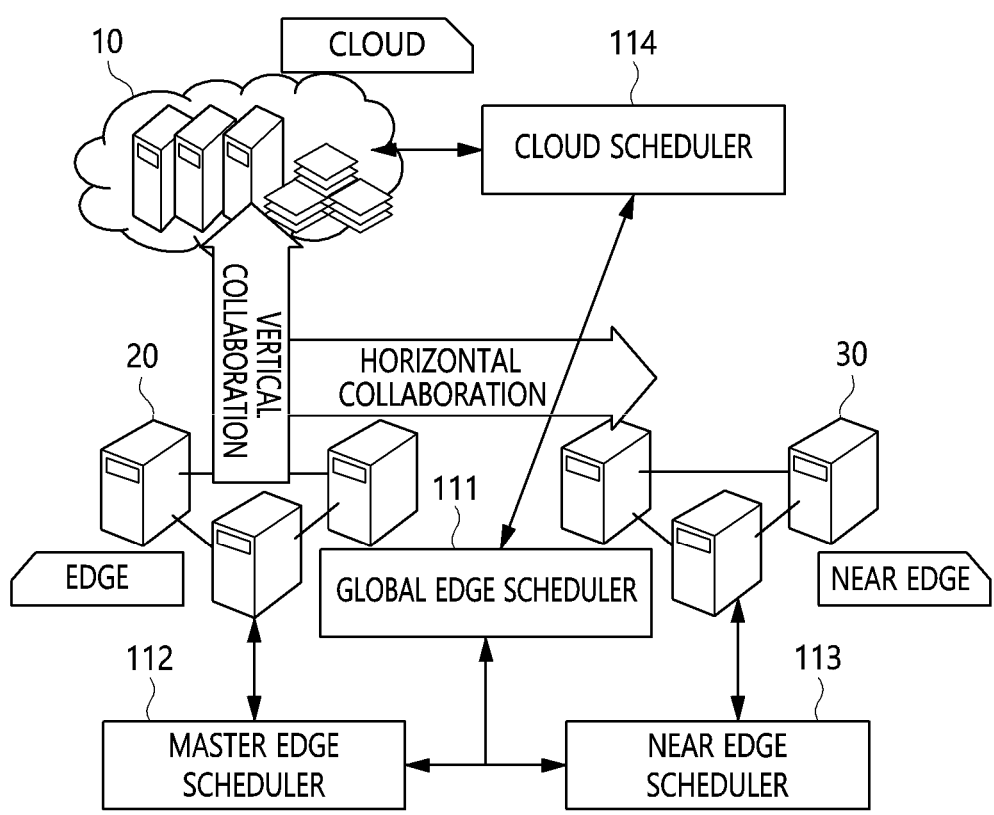
FIG. 13 is a diagram illustrating the schedulers of an edge service system according to an embodiment of the present disclosure.

FIG. 13 is a diagram illustrating schedulers of an edge service system according to an embodiment of the present disclosure.

Referring to FIG. 13, the schedulers of the edge service system according to an embodiment of the present disclosure are depicted.

The schedulers according to the embodiment of the present disclosure may include a scheduler that can dynamically establish a policy, an intelligent scheduler based on analysis of log data, and schedulers which can minimize costs attributable to the change of a scheduling policy and minimize waiting time and latency.

A work target for the schedulers according to an embodiment of the present disclosure may include a resident container for executing a monolithic application or a microservice, and a non-resident container for executing a Function as a Service (FaaS).

The schedulers according to an embodiment of the present disclosure may include four types of schedulers including the global edge scheduler 111 corresponding to the above-described 3 Locations, and three types of types of schedulers 112, 113, and 114, as illustrated in FIG. 13.

The global edge scheduler 111 may correspond to a scheduler for operating in conjunction with a master edge scheduler 112, a near edge scheduler 113, and a cloud scheduler 114, and may also correspond to a global scheduler 110 included in the intelligent scheduler 100.

The master edge scheduler 112 may correspond to a scheduler included in an edge (master edge) system 20 in which a main service is executed.

The near edge scheduler 113 may correspond to a scheduler included in the near-edge system 30 present near the master edge.

The cloud scheduler 114 may correspond to a scheduler included in a public/private cloud 11.

Figure 14:
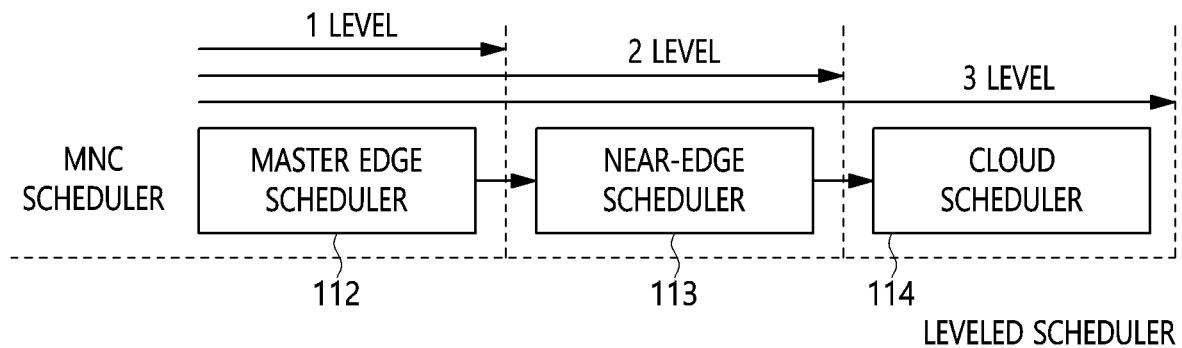
FIG. 14 is a diagram illustrating an example in which the schedulers of the edge service system illustrated in FIG. 13 are implemented as a leveled scheduler.

FIG. 14 is a diagram illustrating an example in which the schedulers of the edge service system illustrated in FIG. 13 are implemented as a leveled scheduler.

Horizontal/vertical collaboration may be applied to an edge service for configuring schedulers according to an embodiment of the present disclosure at the system level. For this operation, schedulers according to the embodiment of the present disclosure may provide series-connection configuration, such a leveled scheduler, and a parallel-connection configuration, such as a shared scheduler. The leveled scheduler may have a series-connection configuration for sequential processing of schedulers, and the shared scheduler may have a parallel-connection configuration in which schedulers contend with each other to find an optimal condition.

Referring to FIG. 14, an example of configuration of the leveled scheduler is illustrated, wherein a 3-leveled scheduler having a series-connection configuration in which schedulers are connected in series in the order of a master edge scheduler 112, a near edge scheduler 113, and a cloud scheduler 114 is depicted.

For example, when allocation of resources by the master edge scheduler 112 corresponding to a first level succeeds, the global edge scheduler 111 may skip the execution of second and third level schedulers. However, when the allocation of resources by the master edge scheduler 112 corresponding to the first level fails, the global edge scheduler 111 may sequentially transfer tasks (work) to the near edge scheduler 113 that is a second level scheduler corresponding to a subsequent level or to a cloud scheduler 114 that is a third level scheduler. A service developer may apply edge service load distribution and collaboration between services at the system level using the leveled scheduler.

Figure 15:
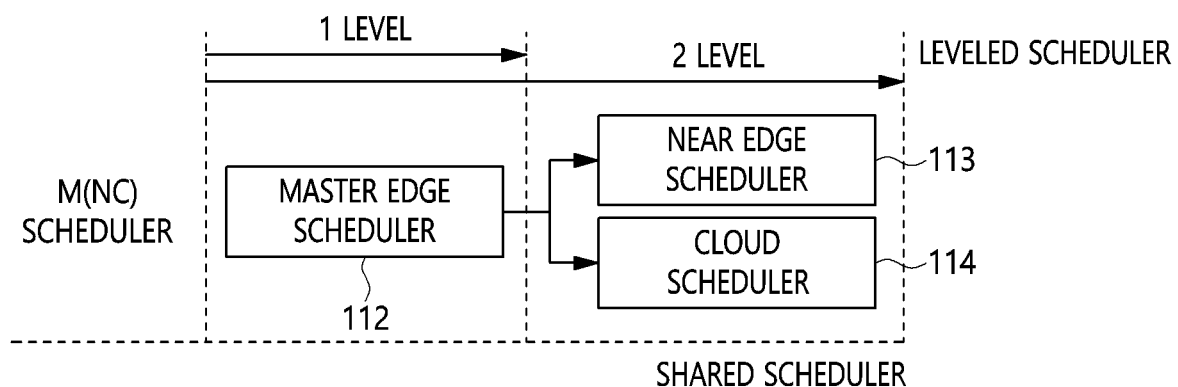
FIG. 15 is a diagram illustrating in detail an example of a complex configuration in which the schedulers of the edge service system illustrated in FIG. 13 are combined with a leveled scheduler and a shared scheduler.

FIG. 15 is a diagram illustrating in detail an example in which the schedulers of the edge service system illustrated in FIG. 13 are implemented in a complex configuration in which a leveled scheduler and a shared scheduler are combined with each other.

Referring to FIG. 15, a complex configuration in which the leveled scheduler and the shared scheduler are combined with each other is illustrated.

Here, it can be seen that the leveled scheduler is configured in a 2-level structure while a shared scheduler is configured between a near edge scheduler 113 and a cloud scheduler 114 at a second level.

The shared scheduler may simultaneously request a task from two or more schedulers, may receive candidates from respective schedulers, and may select an optimal scheduler from among the schedulers based on the candidates.

For example, when the allocation of resources by the master edge scheduler 112, corresponding to a first level, fails, the global edge scheduler 111 may allow the near edge scheduler 113 and the cloud scheduler 114 to simultaneously request a task at a second level scheduler in a contention mode, may receive candidates from respective schedulers, and may select an optimal scheduler from among the schedulers based on the candidates.

Figure 16:
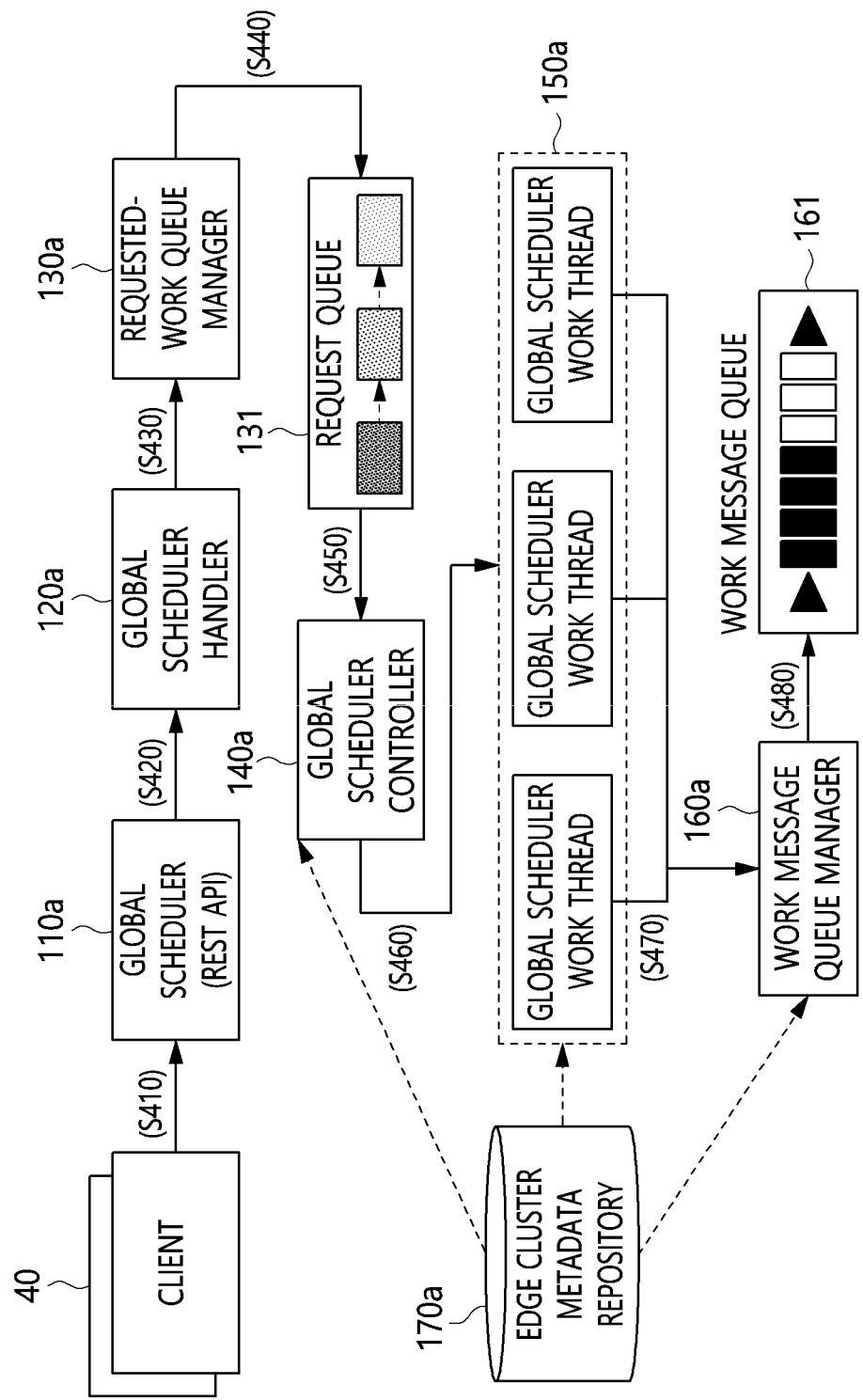
FIG. 16 is a block diagram illustrating the processing flow of an intelligent scheduler according to an embodiment of the present disclosure.
Figure 17:
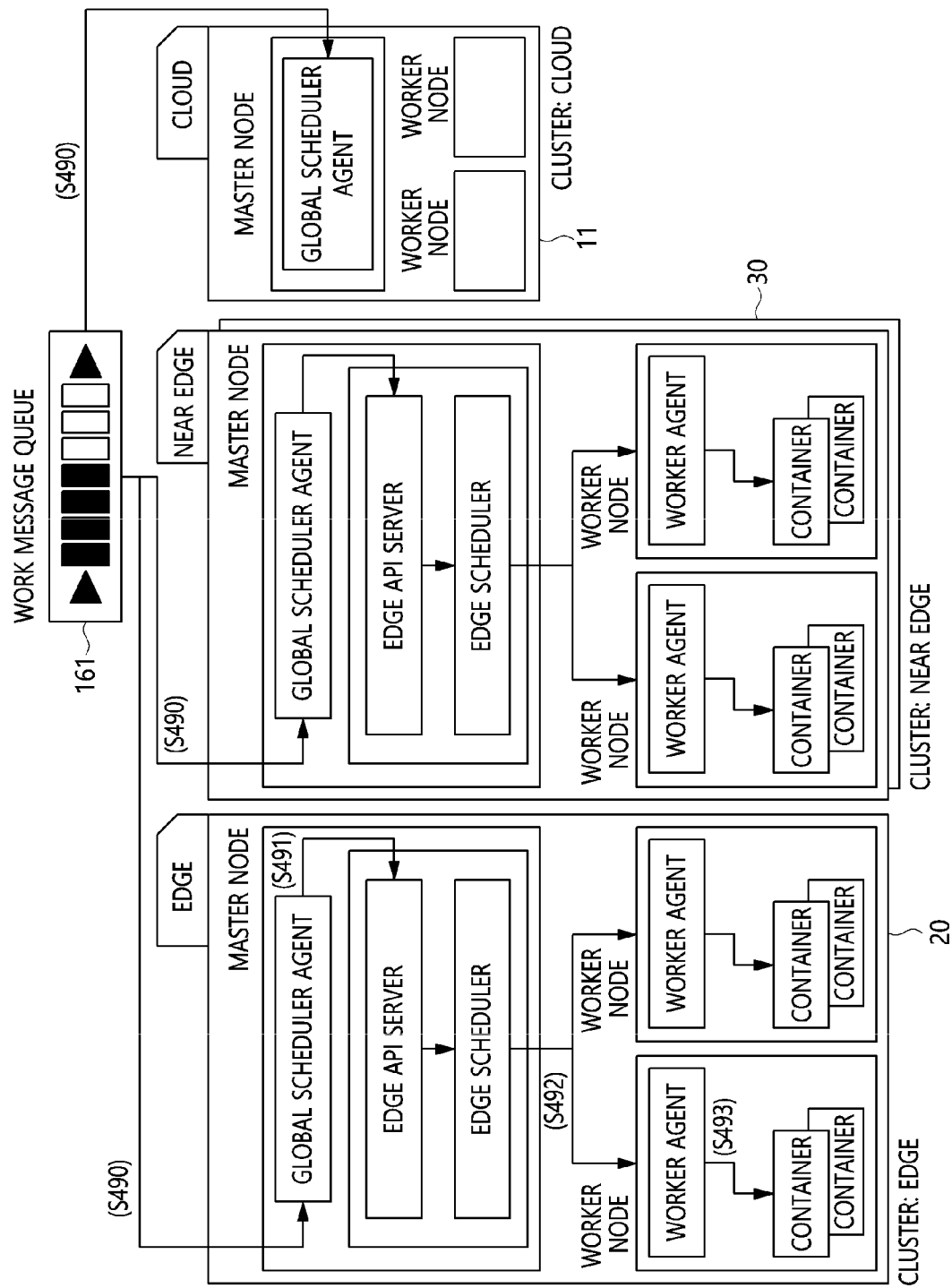
FIG. 17 is a block diagram illustrating the processing flow of an edge, a near edge, and a cloud, continued from the processing flow of the intelligent scheduler illustrated in FIG. 16.

FIG. 16 is a block diagram illustrating the processing flow of an intelligent scheduler according to an embodiment of the present disclosure, and FIG. 17 is a block diagram illustrating the processing flow of an edge, a near edge, and a cloud, continued from the processing flow of the intelligent scheduler illustrated in FIG. 16.

Referring to FIG. 16, a container requested by a client 40 may be created and run in a worker node at step S410.

That is, at step S410, a client 40 may make a REST API call corresponding to container creation to a global scheduler 110a.

Next, at step S420, the global scheduler 110a may execute a global scheduler handler 120a corresponding to the called REST API.

At step S430, a global scheduler handler 120a may transmit the requested data to the requested-work queue manager 130a.

At step S440, the requested-work queue manager 130a may store the requested data in the request queue 131.

At step S450, the global scheduler controller 140a may fetch data to be processed in consideration of priority from the request queue 131.

At step S460, the global scheduler controller 140a may generate multiple work threads in the global scheduler work thread 150a, may transfer the data to be processed to the global scheduler work thread 150a, and may then execute work queue scheduling.

At step S470, the global scheduler work thread 150a may analyze each requested task, and may send a message to be requested form the corresponding cluster 10, 20 or 30 to the work message queue manager 160a.

At step S480, the work message queue manager 160a may store the received message in a work message queue 161.

Referring to FIG. 17, at step S490, the global scheduler agent may check whether any message corresponding to an edge system 20 or a near-edge system 30 is present in the work message queue 161, and may fetch the corresponding message.

At step S491, the global scheduler agent may analyze the fetched message, and may make the corresponding API call to the edge API server thereof.

At steps S492 and S493, the edge scheduler may create and run the requested container through worker agents present in worker nodes.

Figure 18:
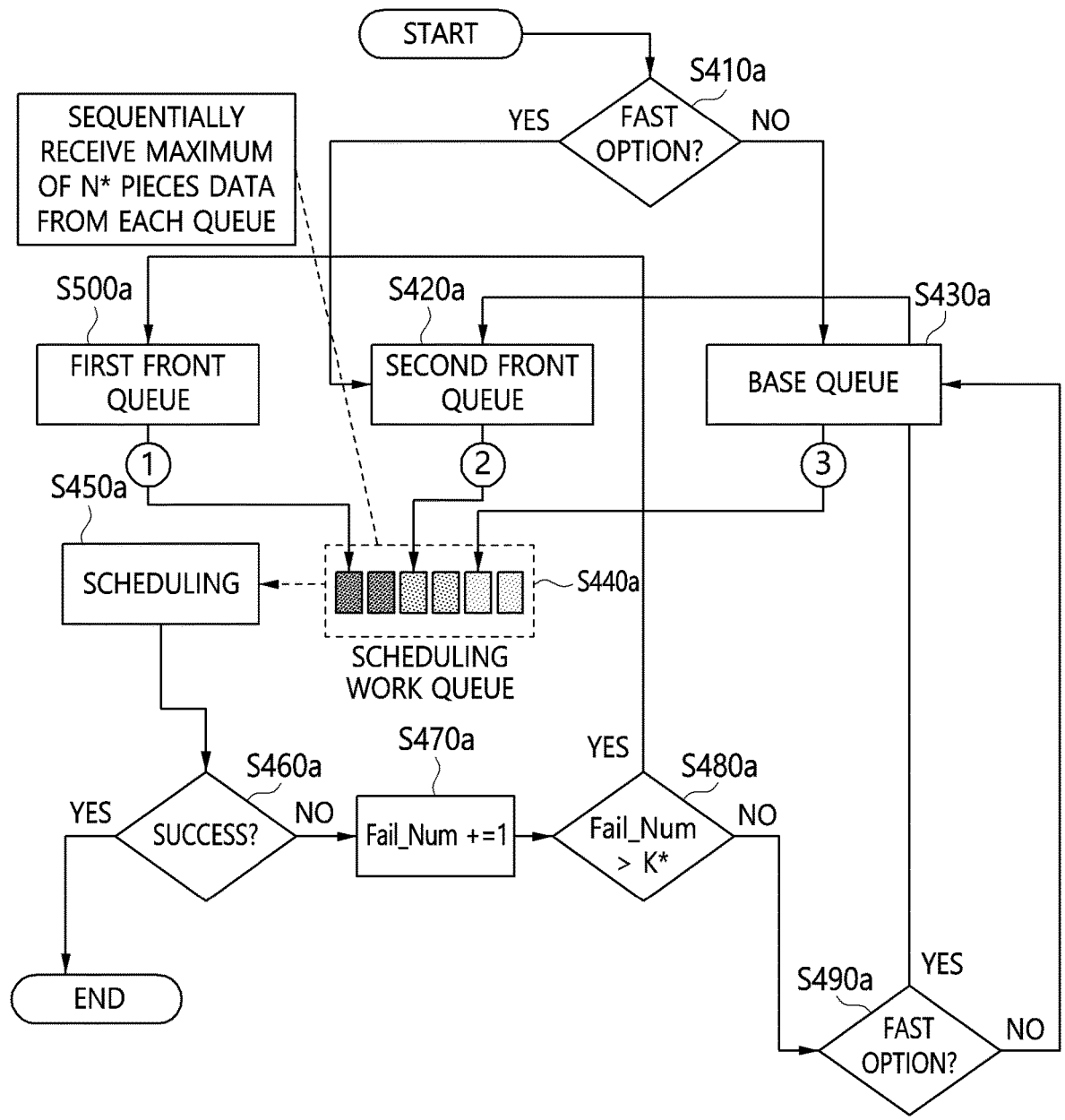
FIG. 18 is an operation flowchart illustrating in detail an example of the work queue scheduling step illustrated in FIG. 17.

FIG. 18 is an operation flowchart illustrating in detail an example of the work queue scheduling step illustrated in FIG. 17.

Referring to FIG. 18, at steps S460 to S480 illustrated in FIG. 17, at the work queue scheduling step, scheduling of tasks (work) has been requested by the work message queue 161, but a sub-step of processing requests by dividing the work message queue 161 into three stages in order to primarily process the task for a request that has repeatedly failed and to process a request having a priority option in preference to a basic scheduling request is illustrated.

The 3-step work message queue 161 may include a first front queue, a second front queue, and a base queue.

The first front queue may be a queue for primarily processing a request that has repeatedly failed.

A second front queue may be a queue to be processed with higher priority than that of a basic scheduling request.

Processing of the 3-step work queue by an edge scheduler policy runner may be performed based on the following rules.

First, at step S410a, it may be checked whether priority option (FAST option) is present in the requested data, when it is checked that there is a priority option, data may be stored in the second front queue at step S420a, and when there is no priority option, the data may be stored in a base queue at step S430a.

At step S440a, the data stored in the first front queue, the second front queue, and the base queue may be stored in the work message queue 161.

At step S450a, whether pieces of data are present in the queues in the order of the first front queue, the second front queue, and the base queue may be checked, and a preset number (N*) of tasks may be sequentially generated from each queue in a scheduling work queue, and thus the scheduling task (work) may be processed.

At step S460a, when scheduling succeeds, the work queue processing procedure may be terminated, whereas when scheduling fails, the number of failures in each request (Fail_Num) may be increased by 1 at step S470a. Whether the number of failures is equal to or greater than the preset number of failures (K*) may be determined at step S480a. When the number of failures is equal to or greater than the preset number of failures (K*), the data may be stored in the first front queue at step S500a.

Here, at step S480a, when the number of failures is less than the preset number of failures (K*), and a priority option is present, data may be stored in the second front queue at step S420a. When there is no priority option, data may be stored in the base queue at step S430a.

The work queue scheduling step of the work queue illustrated in FIG. 18 may be repeated until all request data remaining in the 3-step work queue is processed, and the work queue may wait for request data when there is no data.

Figure 19:
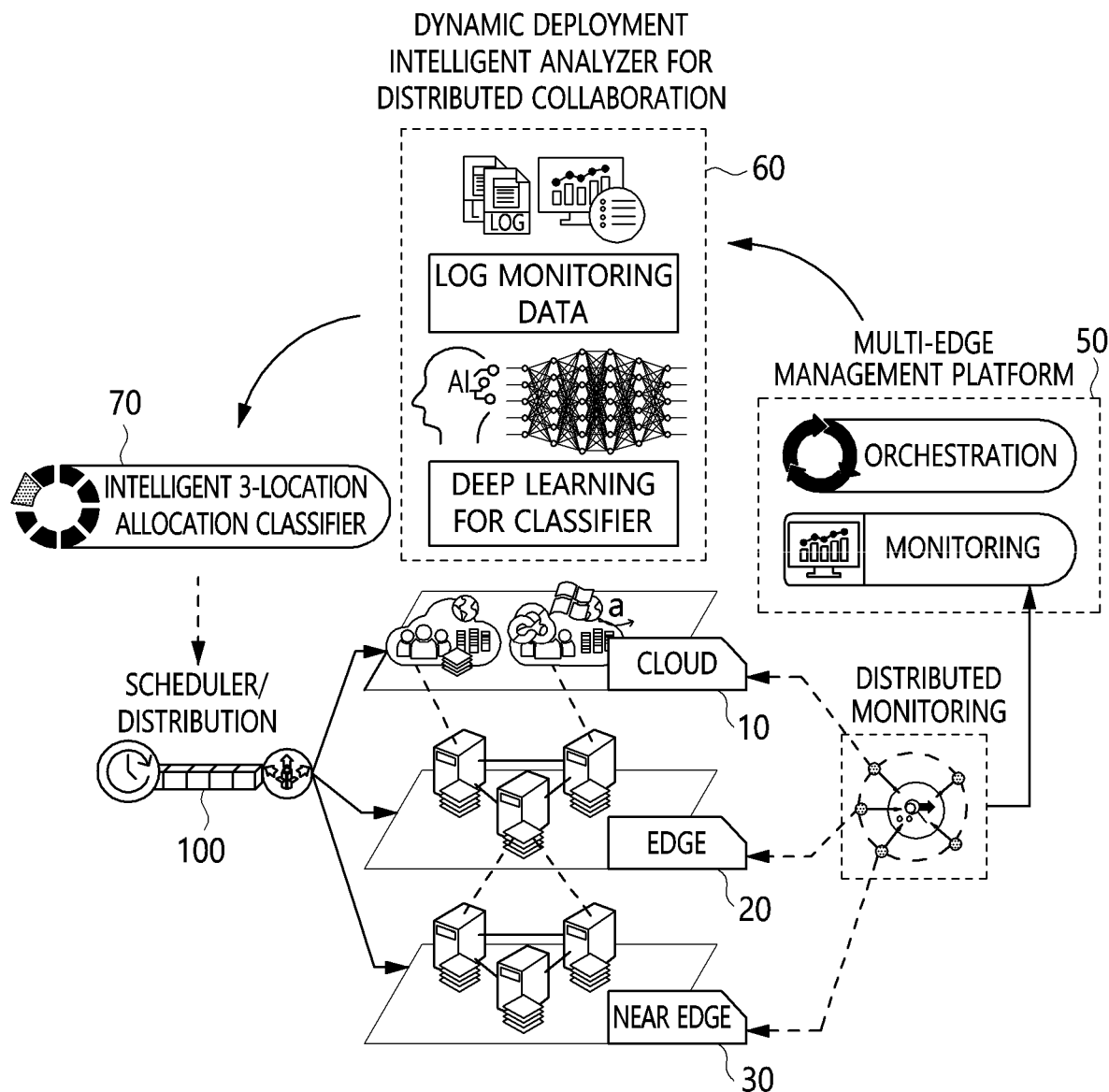
FIG. 19 is a diagram illustrating dynamic deployment for distributed collaboration between services based on an intelligent scheduler according to an embodiment of the present disclosure.

FIG. 19 is a diagram illustrating dynamic deployment for distributed collaboration between services based on an intelligent scheduler according to an embodiment of the present disclosure.

Referring to FIG. 19, schedulers of the intelligent scheduler 100 according to an embodiment of the present disclosure may be provided as intelligent schedulers other than fixed schedulers.

The intelligent scheduler 100 according to an embodiment of the present disclosure may further include an intelligent analyzer 180 which collects real-time monitoring data and logs for a cloud 11, an edge system 20, and a near-edge system 30, and may dynamically deploy various services from the collected data using the intelligent scheduler through AI analysis such as deep learning.

The intelligent analyzer 180 may need a large amount of history data when deriving an intelligent scheduler policy through artificial intelligence training.

Here, the intelligent analyzer 180 may construct an edge service system, and may not immediately perform artificial intelligence training, but may train an edge scheduler policy after the history data has been collected for a predetermined period of time.

Figure 20:
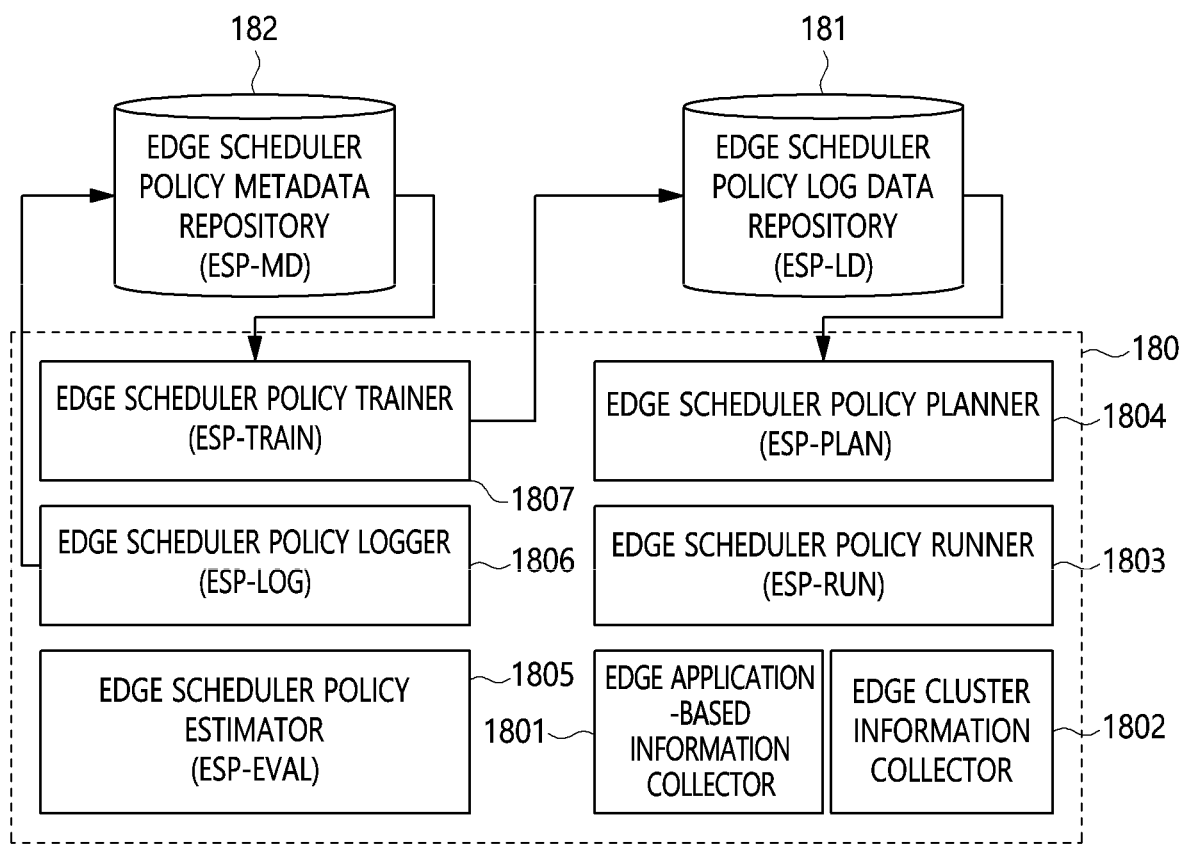
FIG. 20 is a block diagram illustrating an intelligent scheduler including an intelligent analyzer according to an embodiment of the present disclosure.

FIG. 20 is a block diagram illustrating an intelligent scheduler including an intelligent analyzer according to an embodiment of the present disclosure.

Referring to FIG. 20, the intelligence analyzer 180 included in the intelligent scheduler according to an embodiment of the present disclosure is illustrated in detail.

The intelligent analyzer 180 may include an edge application-based information collector 1801, an edge cluster information collector 1802, an edge scheduler policy runner 1803, an edge scheduler policy planner 1804, an edge scheduler policy estimator 1805, an edge scheduler policy logger 1806, and an edge scheduler policy trainer 1807.

The intelligent analyzer 180 may store metadata and scheduler policy logs in an edge scheduler policy metadata repository 181 and an edge scheduler policy log data repository 182.

The edge scheduler policy metadata repository 181 may store edge scheduler policies (ESP).

The edge scheduler policy log data repository 182 may store the results of applying each edge scheduler policy through the edge scheduler policy logger.

The edge application-based information collector 1801 may collect resource information, such as a response speed, an actual CPU use rate, an actual memory use rate, and other resource usage status, for each application run by an edge.

The edge cluster information collector 1802 may collect resource information, such as an actual CPU use rate and an actual memory use rate, for each of physical nodes constituting a cluster.

The edge scheduler policy runner 1803 may run the best policy by applying various edge scheduler policies and then evaluating the edge scheduler policies depending on the degree of optimization.

The edge scheduler policy planner 1804 may establish a plan for running the policy based on the information collected by the edge application-based information collector 1801 and the edge cluster information collector 1802.

The edge scheduler policy evaluator 1805 may evaluate the edge scheduler policies and then evaluate the scheduler policies depending on the degree of optimization.

The edge scheduler policy logger 1806 may store the run scheduler policies and the results of running the scheduler policies in the form of logs.

The edge scheduler policy trainer 1807 may fetch history data from the edge scheduler policy log data repository 182, and may then train the corresponding scheduler policy.

Figure 21:
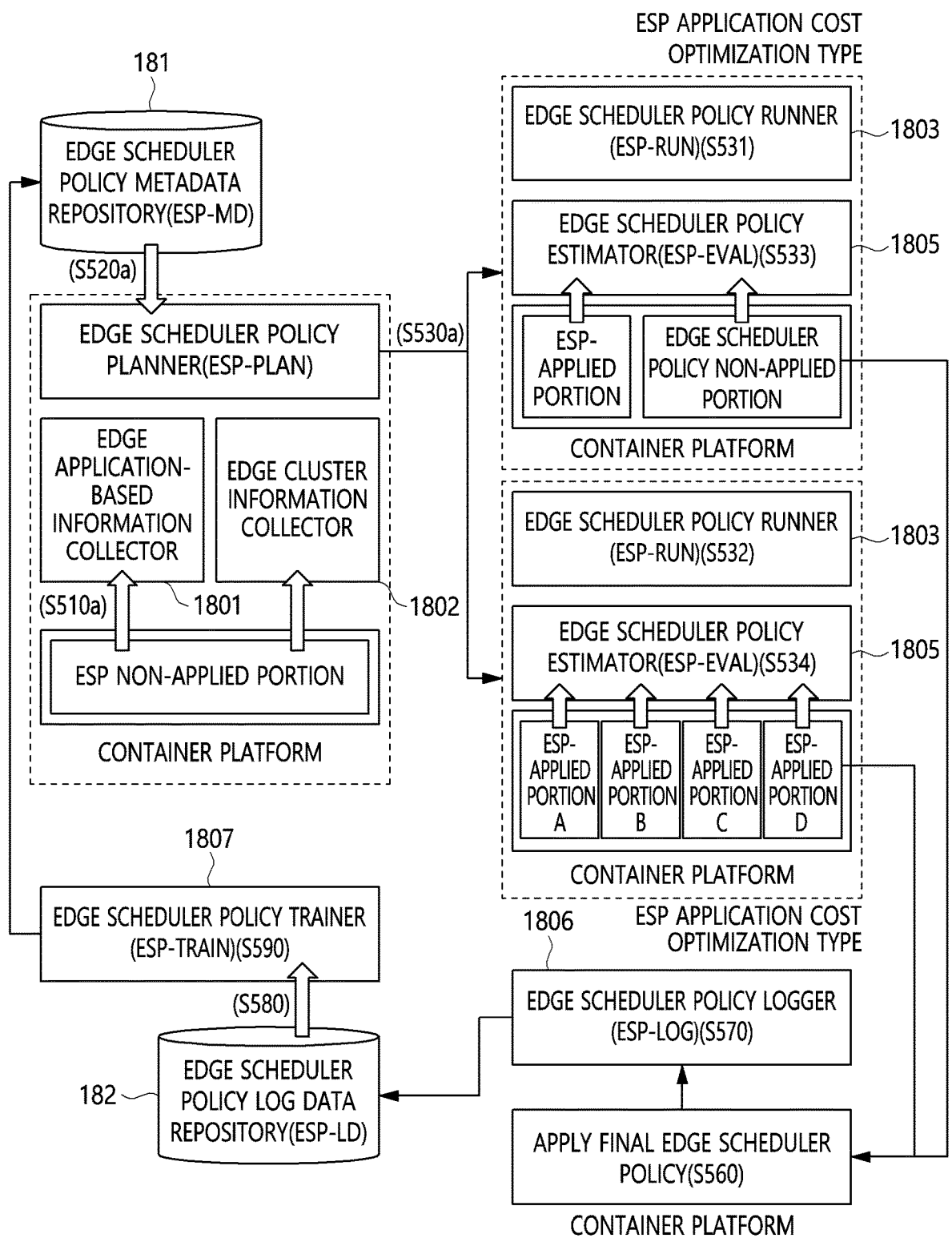
FIG. 21 is a block diagram illustrating the optimized flow of an intelligent scheduler according to an embodiment of the present disclosure.

FIG. 21 is a block diagram illustrating the optimized flow of an intelligent scheduler according to an embodiment of the present disclosure.

Referring to FIG. 21, the key point of intelligent scheduling is to provide both a method for optimizing scheduling at minimum cost and a method for optimizing scheduling at maximum speed.

First, at step S510*a*, information of a container platform may be collected through the edge application-based information collector 1801 and the edge cluster information collector 1802.

At step S520*a*, the edge scheduler policy planner 1804 may select a policy from the edge scheduler policy metadata repository 181 based on the information collected at step S510*a*.

At step S530*a*, one of an ESP application cost minimization type and an ESP application optimization type may be selected based on resource information identical to the load degree of the container platform.

Step S531 may correspond to an ESP-applied cost minimization type, wherein containers may be allocated through the edge scheduler policy executer 1803.

Step S533 may correspond to an ESP-application optimization type, where the scheduler policy may be evaluated through a relative comparison between the state before the edge scheduler policy is applied and the state after the edge scheduler policy has been applied.

Step S532 may correspond to an ESP-applied optimization type, where containers may be allocated through the edge scheduler policy executer 1803.

Step S534 may correspond to an ESP-application cost minimization type, where the scheduler policy may be evaluated through a relative comparison between the state before the edge scheduler policy is applied and the state after the edge scheduler policy has been applied.

Step S560 may be applied to all schedulers so that there are no portions to which the finally selected edge scheduler policy is not applied.

At step S570, the results of evaluating the scheduler policies may be stored in the edge scheduler policy log data repository 182 through the edge scheduler policy logger 1806.

At step S580, the edge scheduler policy trainer 1807 may collect the edge scheduler policy log data stored in the edge scheduler policy log data repository 182.

At step S590, the edge scheduler policy trainer 1807 may generate an optimized intelligent scheduler policy by performing scheduler policy training.

Figure 22:
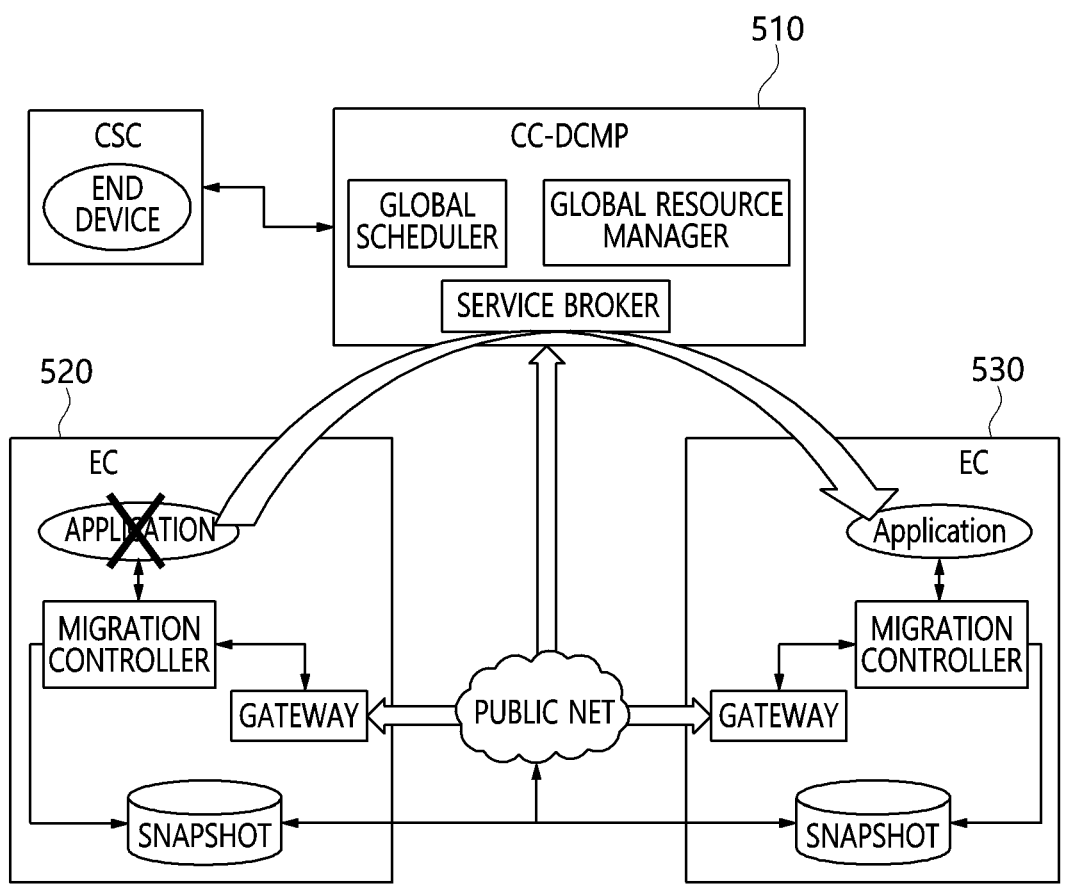
FIG. 22 is a diagram illustrating service migration for risk management in a distributed cloud system according to an embodiment of the present disclosure.

FIG. 22 is a diagram illustrating service migration for risk management in a distributed cloud system according to an embodiment of the present disclosure.

Referring to FIG. 22, a migration service in the distributed cloud system may be provided to redeploy services in real time and maintain continuous services. In consideration of resource scarcity, failures, and cost-effectiveness, migration between edge clouds or between each edge cloud and another cloud may be performed.

The distributed cloud system may receive user requests for each edge cloud to control the distributed cloud system.

Here, the distributed cloud system may cloud a core cloud including large-scale resources, the edge cloud, and a local cloud including middle-scale resources between the core cloud and the edge cloud.

Here, the distributed cloud system may process tasks corresponding to the user requests, distribute the tasks based on a queue, and aggregate the results of the tasks that have been processed.

Here, the distributed cloud system may execute commands including the provision of processed data in response to the user requests.

Here, the commands may be used to perform a function of managing failure when failure in the distributed cloud system occurs.

The management function may include data movement (migration) control between edge clouds including the corresponding edge cloud.

The movement control may be performed to check the state of the edge cloud and store the current state of a snapshot image.

Here, the distributed cloud system may reduce snapshot transmission between the edge clouds using memory.

Here, the distributed cloud system may perform migration of storing the snapshot image in a checkpoint repository corresponding to the shared storage of the edge clouds.

Further, the edge clouds may provide a seamless service even for a proximity service between the edge clouds for supporting the most important mobility service. Therefore, the distributed cloud system and the data processing method of the distributed cloud system may provide a container- or virtual machine-based application migration function as the way to overcome failure in the distributed cloud.

The cloud computing provider of the distributed cloud (CC-DCMP) 510 may provide a global scheduling function and a global resource management function.

In order to perform the migration function, the cloud computing provider 510 may manage functions of migration between clusters and migration between different clouds to perform service migration between multiple clusters, as well as a single cluster. This function may be performed by a service broker, and the states of respective services may be transmitted to a target application.

Here, edge computing systems 520 and 530, which are service migration provision devices, may capture the state of the application in a transmittable format in real time, and may store the state of the application in the form of a snapshot.

Basically, in global management for the distributed cloud, a scheduler may allocate an application to a node through a Distributed Cloud Management Platform (DCMP), and a controller may create, delete or update the application while communicating with the node through a gateway. Here, the gateway may take charge of a control function of connecting networks between the clusters to each other.

The maintenance of the application may be performed at each node, and only a control task of creating containers or virtual machines may be performed by individual agents residing on a target node itself.

Each of the edge computing systems 520 and 530 may provide the overall migration function through a migration controller.

When there are snapshots (checkpoint images) for maintaining the state of the application, the edge computing systems 520 and 530 may transmit the snapshots between the nodes.

For this operation, the edge computing systems 520 and 530 may provide a storage function including a fast data sharing function. Therefore, the edge computing systems 520 and 530 may utilize a shared fast storage mechanism and utilize a high-speed network connection in an orchestration layer so as to reduce data transmission between a node and pod.

Migration for system failure may be provided by a Cloud Service Provider (CSP).

Migration may include service migration and application migration.

Application migration may include a control process of checking the state of the corresponding application on an edge controller (EC), verify the network of a target node, store the current state of the application as a snapshot image, and restore an image at a restoration location.

Service migration may include a function of connecting a previous node and an IP address thereof to a destination node and an IP address thereof to which the service is migrated, through a proxy service.

The CSP may provide network connections using additional cloud resources for service migration.

Network connections may include a high-speed connection method performed through a gateway for a connection between distributed clouds.

The high-speed connection method may include dedicated and direct network connections using tunneling such as IPsec tunneling, or path bypassing through network proxies.

Each cloud may be implemented using a single cluster or multiple clusters.

The CSP may provide data management for service migration.

Data management for service migration may reduce the transmission of snapshots (e.g., checkpoints) between nodes using shared high-speed storage or a cache mechanism.

Data management for service migration may include data management and data storage deployment using a microservice and virtual machines.

In the case of load balancing, system failures, and Cloud Service Customer (CSC) policies, the DCMP may search for CSC applications and data, and may migrate the corresponding service to available resources of the distributed cloud.

Figure 23:
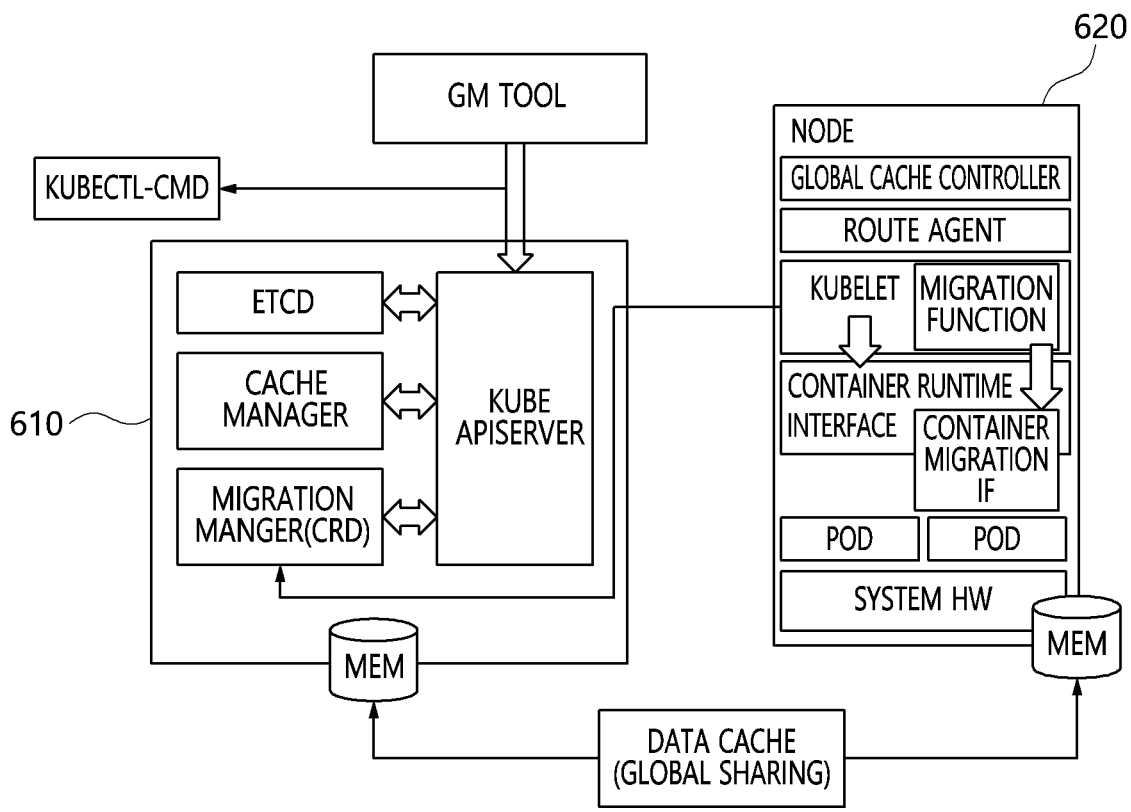
FIG. 23 is a block diagram illustrating a cloud service migration device of a distributed cloud system according to an embodiment of the present disclosure.

FIG. 23 is a block diagram illustrating a cloud service migration device of a distributed cloud system according to an embodiment of the present disclosure.

Referring to FIG. 23, the cloud service migration device 610 of the distributed cloud system according to the embodiment of the present disclosure may stably capture the state of each container in a transmittable format in real time.

A pod may be a single container or may be composed of multiple containers. The state of each container may be transmitted from a source pod to a destination pod.

The cloud service migration device 610 may create and unify container-based APIs using a Checkpoint Restore in Userspace (CRIU) as a container migration interface.

The CRIU is a software tool for a Linux Operating System (OS). Using this tool, it is possible to stop a running application and checkpoint it to permanent storage as a collection of files.

Basically in a container-based platform (K8s), the pod is adjusted by the process of a node 620.

Therefore, the cloud service migration device 610 may allocate a pod to the node 620, and a duplication controller may create, delete or update the pod while communicating with a suitable node.

The node 620 may perform a control task of maintaining the pod and creating a container through a migration agent.

The cloud service migration device 610 may perform migration through K8S CustomResourceDefinitions (CRD) in which a migration function is predefined (EC capability Enabler—Migration Manager).

CRD takes charge of a control function of managing migration in association with the management function of the K8S.

As illustrated in FIG. 23, the cloud service migration device 610 of the distributed cloud system may call an offloading controller (EC Capability operation-Migration agent) residing on the node 620 through the API of the K8S.

When there is a container checkpoint image of the pod, a mechanism for transmitting data of the image between nodes is required. In current KUBERNETES™, a current unique example of data communication between nodes enables only a redeployment task to be performed by means of the transmission of configuration data such as a pod template. Further, the node 620 does not communicate with other nodes in the current orchestration layer. This becomes large obstruction to data and service migration for real-time seamless services. Therefore, the cloud service migration device 610 may utilize the mechanism of the shared storage to reduce data transmission between the node and the pod, and may also utilize a network connection function in the orchestration layer.

For the purpose of service migration using the shared storage, the cloud service migration device 610 may check the pod state of the migration target node 620 on the edge cloud through an offloading controller, and may extract the pod state.

Here, the cloud service migration device 610 may check the states of all containers in consideration of the order of dependency between the containers in the source pod/node.

The cloud service migration device 610 may provide a checkpoint creation call function.

In this case, the cloud service migration device 610 may dump live image files of the containers included in the pod, and may then generate snapshots thereof.

The cloud service migration device 610 may provide a function of transmitting checkpoint images and pod states.

In this case, the cloud service migration device 610 may transmit the snapshots to a checkpoint repository corresponding to the shared storage of the edge cloud. The checkpoint repository may provide an additional management function so as to easily search for and process files (in association with a data management and deployment management function).

The cloud service migration device 610 may check network connection to a remote target node.

The cloud service migration device 610 may provide a function of checking and monitoring checkpoint states.

Here, the cloud service migration device 610 may monitor the state information of the checkpoint repository.

The cloud service migration device 610 may provide a checkpoint time point restoration call function.

Here, the cloud service migration device 610 may call the restoration function of each container in consideration of the dependency order of the containers from the snapshots and container state files.

Here, the cloud service migration device 610 may perform examination for an application state in the edge, network examination of a migratable node, storage of the current state of the application as a snapshot image, and image restoration at a restoration target location so as to perform migration of the edge computing system (including a distributed cloud environment).

Each cloud may be configured using clusters, and high-speed connection may include a dedicated network connection method for tunneling in virtualization, a path bypassing method through network proxies, or the like.

The cloud service migration device 610 may connect the IP addresses of the node from which the corresponding snapshot is extracted and the node to which the snapshot is to be migrated to each other, through a predefined proxy service.

Figure 24:
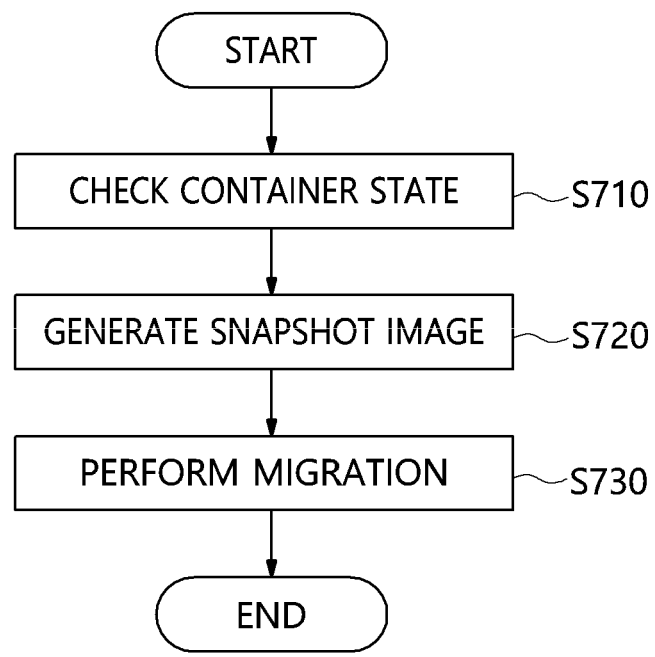
FIG. 24 is an operation flowchart illustrating a cloud service migration method of a distributed cloud system according to an embodiment of the present disclosure.

FIG. 24 is an operation flowchart illustrating a cloud service migration method of a distributed cloud system according to an embodiment of the present disclosure.

Referring to FIG. 24, as a data processing method of the distributed cloud system according to the embodiment of the present disclosure, a cloud service migration method may check the state of a container at step S710.

That is, at step S710, the cloud service migration device 610 may check the pod state of a migration target node 620 on an edge cloud through an offloading controller, and may extract the pod state.

Here, at step S710, the distributed cloud system may receive user requests for the edge cloud to control the distributed cloud system.

Here, the distributed cloud system may cloud a core cloud including large-scale resources, the edge cloud, and a local cloud including middle-scale resources between the core cloud and the edge cloud.

Here, at step S710, the distributed cloud system may process tasks corresponding to the user requests, distribute the tasks based on a queue, and aggregate the results of the tasks that have been processed.

A pod may be a single container or may be composed of multiple containers. The state of each container may be transmitted from a source pod to a destination pod.

Here, at step S710, the states of all containers may be checked in consideration of the order of dependency between the containers in the source pod/node.

The cloud service migration method according to the embodiment of the present disclosure may generate a snapshot at step S720.

In other words, at step S720, the live image file of the container may be dumped, and then the snapshot thereof may be generated.

Here, at step S720, the distributed cloud system may execute commands including the provision of processed data in response to the user requests.

Here, the commands may be used to perform a function of managing failure when failure occurs in the distributed cloud system.

The management function may include data movement (migration) control between edge clouds including the corresponding edge cloud.

The movement control may be performed to check the state of the edge cloud and store the current state of a snapshot image.

Furthermore, the cloud service migration method according to the embodiment of the present disclosure may perform migration at step S730.

That is, at step S730, the snapshot image may be transmitted to the checkpoint repository. The checkpoint repository may provide an additional management function so as to easily search for and process files (in association with a data management and deployment management function).

At step S730, the distributed cloud system may reduce snapshot transmission between the edge clouds using memory.

Here, at step S730, the distributed cloud system may perform migration of storing the snapshot image in a checkpoint repository corresponding to the shared storage of the edge clouds.

Here, at step S730, a network connection to a remote target node may be checked.

In detail, at step S730, migration may be performed through K8S CustomResourceDefinitions (CRD) in which a migration function is predefined (EC capability Enabler—Migration Manager).

At step S730, the checkpoint image and the pod state may be transmitted.

Here, at step S730, the state information of the checkpoint repository may be monitored.

At step S730, a checkpoint time point restoration call function may be provided.

In this case, at step S730, the restoration function of each container may be called in consideration of the dependency order of the containers from the snapshots stored in the checkpoint repository and container state files.

At step S730, the IP addresses of the node from which the corresponding snapshot is extracted and the node to which the snapshot is to be migrated may be connected to each other through a predefined proxy service.

Figure 25:
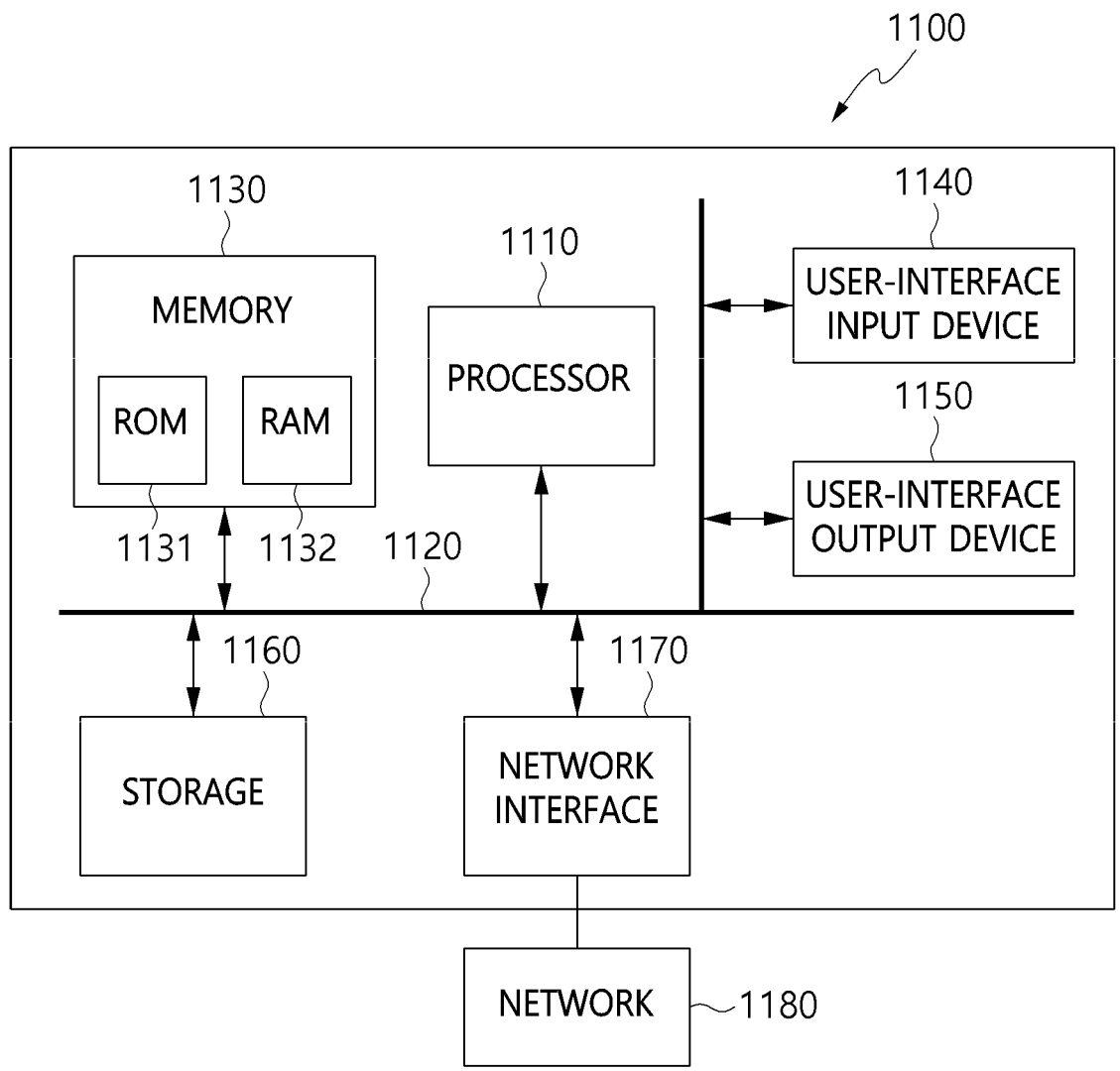
FIG. 25 is a diagram illustrating a computer system according to an embodiment of the present disclosure.

FIG. 25 is a diagram illustrating a computer system according to an embodiment of the present disclosure.

Referring to FIG. 25, each of a distributed cloud system and a storage medium thereof according to embodiments of the present disclosure may be implemented in a computer system 1100 such as a computer-readable storage medium. As illustrated in FIG. 25, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Further, a distributed cloud system according to an embodiment of the present disclosure may include one or more processors 1110 and memory 1130 configured to store at least one program that is executed by the one or more processors, wherein the one or more processors 1110 are configured to receive a request of a user for an edge cloud and control a distributed cloud system, wherein the distributed cloud system includes a core cloud including a large-scale resource, the edge cloud, and a local cloud including a middle-scale resource between the core cloud and the edge cloud, wherein the processor is configured to execute processes of processing tasks corresponding to the user request, distributing the tasks based on a queue, and aggregating results of processed tasks; and providing processed data in response to a request of the user, and wherein the processor is configured to perform a management function in case of failure in the distributed cloud system.

Here, the management function may include data movement control between multiple edge clouds including the edge cloud, the movement control may be configured to check states of the edge clouds and store current states of snapshot images, and transmission of the snapshot images between the edge clouds may be reduced using the memory.

Here, the processor may be configured to perform migration of storing the snapshot images in a checkpoint repository corresponding to a shared storage of the edge clouds.

Furthermore, there is provided storage 1160 that is a storage medium for storing a computer-executable program according to an embodiment of the present disclosure, the program executing instructions including receiving a request of a user for an edge cloud and controlling a distributed cloud system, wherein the distributed cloud system includes a core cloud including a large-scale resource, the edge cloud, and a local cloud including a middle-scale resource between the core cloud and the edge cloud; processing tasks corresponding to the user request, distributing the tasks based on a queue, and aggregating results of processed tasks; providing processed data in response to a request of the user, and wherein the instructions perform a management function in case of failure in the distributed cloud system.

Here, the management function may include data movement control between multiple edge clouds including the edge cloud, the movement control may be configured to check states of the edge clouds and store current states of snapshot images, and transmission of the snapshot images between the edge clouds may be reduced using a shared storage.

Here, the program may be configured to perform migration of storing the snapshot images in a checkpoint repository corresponding to a shared storage of the edge clouds.

The present disclosure may provide service migration for efficient collaboration between clusters.

Further, the present disclosure may provide a high-speed network connection between multiple clusters for a collaboration service.

Furthermore, the present disclosure may provide optimal management for collaboration between clusters on a connected network.

As described above, in the distributed cloud system, the data processing method of the distributed cloud system, and the storage medium according to the present disclosure, the configurations and schemes in the above-described embodiments are not limitedly applied, and some or all of the above embodiments can be selectively combined and configured such that various modifications are possible.

What is claimed is:

1. A data processing method of a distributed cloud system, comprising:
    receiving a request of a user for an edge cloud and controlling a distributed cloud system, wherein the distributed cloud system comprises a core cloud including a large-scale resource, the edge cloud, and a local cloud including a middle-scale resource between the core cloud and the edge cloud;
    processing tasks corresponding to the request through a scheduler of the core cloud,
    distributing the tasks based on a queue, and aggregating results of the processed tasks; and
    providing processed data in response to the request,
    wherein the distributed cloud system provides a management function in case of failure in the distributed cloud system,
    wherein the management function includes a data movement control between multiple edge clouds including the edge cloud,
    wherein the data movement control is configured to check states of the multiple edge clouds and store current states of snapshot images, and
    wherein transmission of the snapshot images between the multiple edge clouds is reduced using a shared storage;
    the data processing method further comprising providing a high-speed gateway for the multiple edge clouds in the distributed cloud system for migration,
    wherein the high-speed gateway provides a network connection function by which the multiple edge clouds in the distributed cloud system is directly connected using layer L3 tunneling.

2. A distributed cloud system, comprising:
    one or more processors; and
    a memory configured to store at least one program that is executed by the one or more processors,
    wherein the one or more processors are configured to receive a request of a user for an edge cloud and control a distributed cloud system, wherein the distributed cloud system comprises a core cloud including a large-scale resource, the edge cloud, and a local cloud including a middle-scale resource between the core cloud and the edge cloud, wherein the one or more processors are configured to execute processes of:

processing tasks corresponding to the request, distributing the tasks based on a queue, and aggregating results of processed tasks; and providing processed data in response to the request, and wherein the processor is configured to perform a management function in case of failure in the distributed cloud system, wherein the management function includes a data movement control between multiple edge clouds including the edge cloud, wherein the data movement control is configured to check states of the multiple edge clouds and store current states of snapshot images, and wherein transmission of the snapshot images between the multiple edge clouds is reduced using a shared storage;

the one or more processors being further configured to provide a high-speed gateway for the multiple edge clouds in the distributed cloud system for migration, wherein the high-speed gateway provides a network connection function by which the multiple edge clouds in the distributed cloud system is directly connected using layer L3 tunneling.

3. A non-transitory computer readable storage medium for storing a computer-executable program, the program executing instructions to perform operations comprising:

receiving a request of a user for an edge cloud and controlling a distributed cloud system, wherein the distributed cloud system comprises a core cloud including a large-scale resource, the edge cloud, and a local cloud including a middle-scale resource between the core cloud and the edge cloud;

processing tasks corresponding to the request, distributing the tasks based on a queue, and aggregating results of processed tasks; and providing processed data in response to the request, wherein the instructions perform a management function in case of failure in the distributed cloud system, wherein the management function includes a data movement control between multiple edge clouds including the edge cloud, wherein the data movement control is configured to check states of the multiple edge clouds and store current states of snapshot images, and wherein transmission of the snapshot images between the multiple edge clouds is reduced using a shared storage;

the operations further comprising providing a high-speed gateway for the multiple edge clouds in the distributed cloud system for migration, wherein the high-speed gateway provides a network connection function by which the multiple edge clouds in the distributed cloud system is directly connected using layer L3 tunneling.

\* \* \* \* \*